(12) United States Patent
Du

(10) Patent No.: US 7,844,417 B2
(45) Date of Patent: Nov. 30, 2010

(54) GIS-BASED RAPID POPULATION ASSESSMENT TOOL

(75) Inventor: Wei Du, Springfield, VA (US)

(73) Assignee: First American Real Estate Solutions, LLC, Westlake, TX (US)

(*) Notice: Subject to any disclaimer, the term of this patent is extended or adjusted under 35 U.S.C. 154(b) by 1846 days.

(21) Appl. No.: 10/784,325

(22) Filed: Feb. 23, 2004

(65) Prior Publication Data

US 2004/0260510 A1 Dec. 23, 2004

Related U.S. Application Data

(60) Provisional application No. 60/449,283, filed on Feb. 21, 2003.

(51) Int. Cl.
*G06F 19/00* (2006.01)
*G06F 17/40* (2006.01)

(52) U.S. Cl. .................... 702/179; 702/187

(58) Field of Classification Search .............. 702/1, 702/2, 127, 179, 180, 181, 187, 188, 189; 703/6, 11
See application file for complete search history.

(56) References Cited

U.S. PATENT DOCUMENTS 7,054,828 B2 * 5/2006 Heching et al. ............ 705/10
2002/0128884 A1 * 9/2002 Heching et al. ............ 705/7

* cited by examiner

*Primary Examiner*—Edward R Cosimano
(74) *Attorney, Agent, or Firm*—Pandiscio & Pandiscio

(57) ABSTRACT

Method of assessing population with a spatially-stratified random sample comprising creating a grid on a study area, the grid being defined by target grid points to form grid cell, dividing each grid cell into a series of sub-grid cells, each of the series of sub-grid cells being identified from left to right and bottom to top within each of the grid cells, identifying and listing each sub-grid cell that intersects the study area, the list of sub-grid cells being sequences in the same order as the grid cells and the sub-grid cells, dividing the sub-grid list into sections, each of the sections being configured to have substantially equal numbers of sub-grid cells, and the number of sections being equal to the number of targeted grid points, and selecting a random sub-grid cell from each section of sub-grid cells to obtain the spatially-stratified random sample.

40 Claims, 26 Drawing Sheets

GIS-BASED RAPID POPULATION ASSESSMENT TOOL

REFERENCE TO PENDING PRIOR PATENT APPLICATIONS

This patent application also claims benefit of expired prior U.S. Provisional Patent Application Ser. No. 60/449,283, filed Feb. 21, 2003 by Wei Du for CENSUSVIEW: A GIS BASED SYSTEM FOR RAPID POPULATION ASSESSMENT IN CHES.

FIELD OF THE INVENTION

This invention relates to systems and methods of rapidly assessing population.

SUMMARY OF THE INVENTION

1 Overview (See FIG. 1)

The product contains nine categories of core functionality. Each of the following categories comprises the underlying structure of the rapid population assessment tool:
  Project Management
  Study Boundary Delineation
  Spatially Stratified Sampling
  Population Estimation
  GIS and Mapping Tools
  GPS Communication
  Analysis Tools
  GIS Interoperability and Web Service Integration
  Worldwide Population Portal Website.

In one form of the present invention, there is provided a method of rapidly assessing population with a spatially-stratified random sample, the method comprising:
  creating a systematic grid on a study area, the systematic grid being defined by a given number of target grid points so as to form grid cells;
  dividing each one of the grid cells into a series of sub-grid cells, each one of the series of sub-grid cells being identified from left to right and from bottom to top within each one of the grid cells;
  identifying each one of the sub-grid cells that intersect the study area;
  listing each one of the sub-grid cells that intersect the study area, the list of sub-grid cells being sequences in the same order as the grid cells and the sub-grid cells;
  dividing the sub-grid list into a given number of sections, each of the given number of sections being configured to have substantially equal numbers of sub-grid cells, and the given number of sections being equal to the given number of targeted grid points; and
  selecting a random sub-grid cell from each section of sub-grid cells so as to obtain the spatially-stratified random sample.

In another form of the present invention, there is provided a system for rapidly assessing population with a spatially-stratified random sample, the system comprising:
  a systematic grid created on a study area, the systematic grid being defined by a given number of target grid points so as to form grid cells;
  first division means for dividing each one of the grid cells into a series of sub-grid cells, each one of the series of sub-grid cells being identified from left to right and bottom to top within each one of the grid cells;
  identification means for identifying each one of the sub-grid cells that intersect the study area;
  a list generator for listing each one of the sub-grid cells that intersect the study area, the list of sub-grid cells being sequenced in order of the grid cells and the sub-grid cells;
  second division means for dividing the sub-grid list into a given number of sections, each of the given number of sections being configured to have a substantially equal number of sub-grid cells, and the given number of sections being equal to the given number of targeted grid points; and
  selection means for selecting a random sub-grid cell from each section of sub-grid cells so as to obtain the spatially-stratified random sample.

In another form of the present invention, there is provided a method of rapidly assessing a population, the method comprising:
  determining a boundary of a study area;
  selecting a population estimation methodology for use on the study area;
  assigning locations within the study area to field data collectors;
  collecting data with the field data collectors;
  uploading the collected data to a computer;
  preparing a dynamic population estimation/prediction using the computer;
  using the dynamic population estimation/prediction to make resource analysis calculations and geographic assignments;
  uploading the resource analysis calculations and geographic assignments to the Internet for review by relief organizations throughout the world; and
  distributing supplies based on the uploaded resource analysis calculations and geographic assignments.

In another form of the present invention, there is provided a system for rapidly assessing population, the system comprising:
  first determination means for determining a boundary of a study area having the population;
  selection means for selecting a population estimation methodology for use on the study area;
  assignment means for assigning locations within the study area to field data collectors;
  collection means for collecting data with the field data collectors;
  first transfer means for transferring the collected data to a computer;
  second determination means for determining a dynamic population estimation/prediction using the computer;
  third determination means for determining resource analysis calculations and geographic assignments based on the dynamic population estimation/prediction;
  second transfer means for transferring the resource analysis calculations and geographic assignments to the Internet for review by organizations throughout the world; and
  distribution means for distributing supplies based on the resource analysis calculations and geographic assignments.

In another form of the present invention, there is provided a method of rapidly assessing population within a study area using an integration of geographic information system (GIS), at least one of satellite imagery and aerial imagery, and a selected population method, the method comprising:
  loading the at least one satellite imagery and aerial imagery corresponding to the study area into the GIS;

demarcating dwellings on the satellite imagery loaded into the GIS;

applying a spatially-stratified sampling procedure with a predefined estimate;

simulating a distance measurement procedure based on the selected population estimation method on top of the at least one satellite imagery and aerial imagery;

guiding a user to determine mouse insertion points by display reference lines and points based on the selected population estimation method;

computing distance measurements for the selected population estimation method from the mouse input points;

prompting the user to enter other related information during the procedure to increase productivity for distance measurements and data collection; and ascertaining an overall population in the study area based on the spatially-stratified sampling procedure.

In another form of the present invention, there is provided a system for rapidly assessing population within a study area, the system comprising:

a geographic information system (GIS) on a computer;

input means for inputting satellite imagery corresponding with the study area into the GIS;

demarcation means for demarcating dwellings on the satellite imagery loaded into the GIS;

application means for applying a spatially-stratified sampling procedure with a predefined estimate; and computation means for computing an overall population in the study area based on the spatially-stratified sampling procedure.

In another form of the present invention, there is provided a method of rapidly assessing population within a study area using a geographic information system (GIS), the method comprising:

loading at least one from a group consisting of satellite imagery and aerial imagery corresponding to the study area into the GIS;

demarcating dwellings on the satellite imagery loaded into the GIS;

applying a spatially-stratifies sampling procedure with a predefined estimate; and ascertaining an overall population in the study area based on the spatially-stratified sampling procedure.

BRIEF DESCRIPTION OF THE DRAWINGS

These and other objects and features of the present invention will be more fully disclosed or rendered obvious by the following detailed description of the present invention, which is to be considered together with the accompanying drawings wherein like numbers refer to like parts, and further wherein.

DETAILED DESCRIPTION OF THE PRESENT INVENTION

Figure 1:
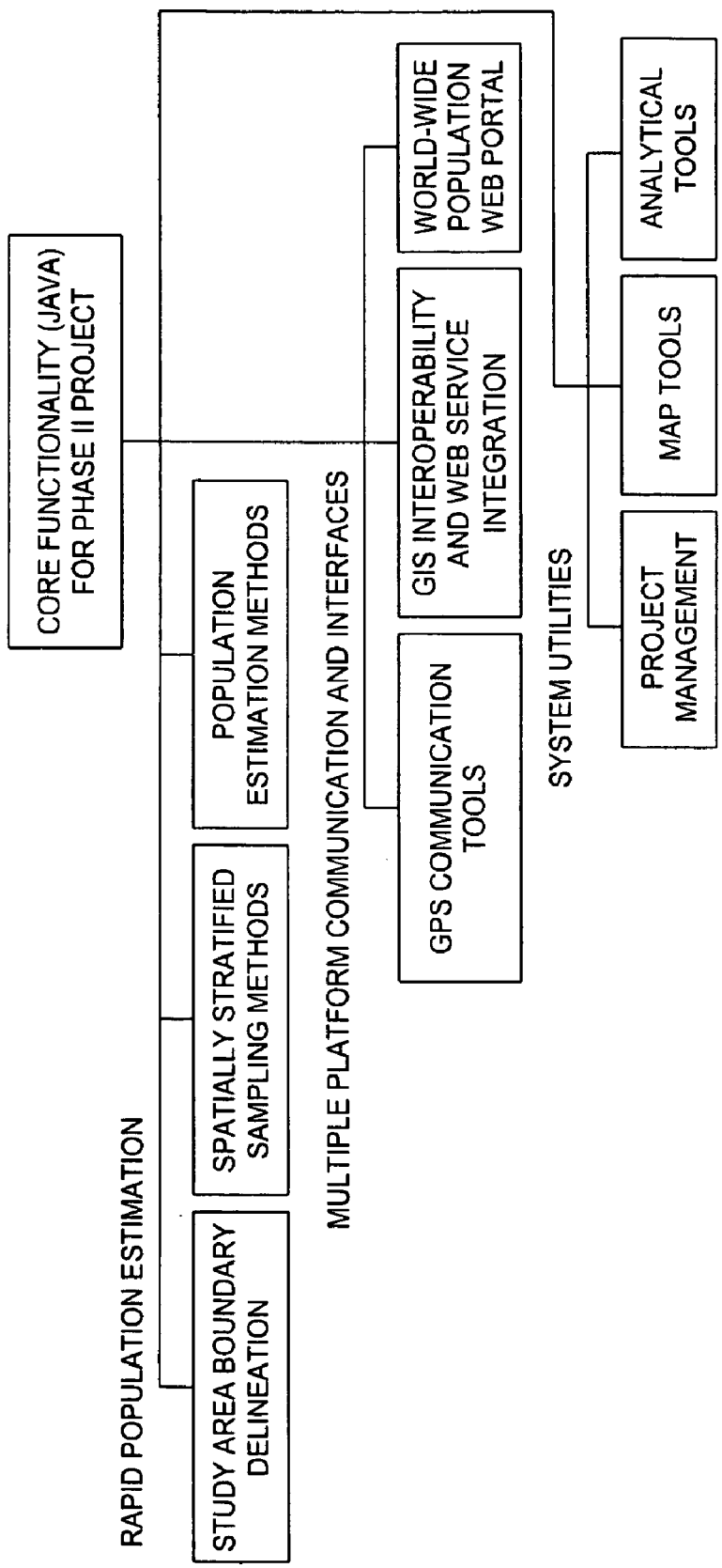
FIG. 1 illustrates an overview of the present invention.
Figure 2:
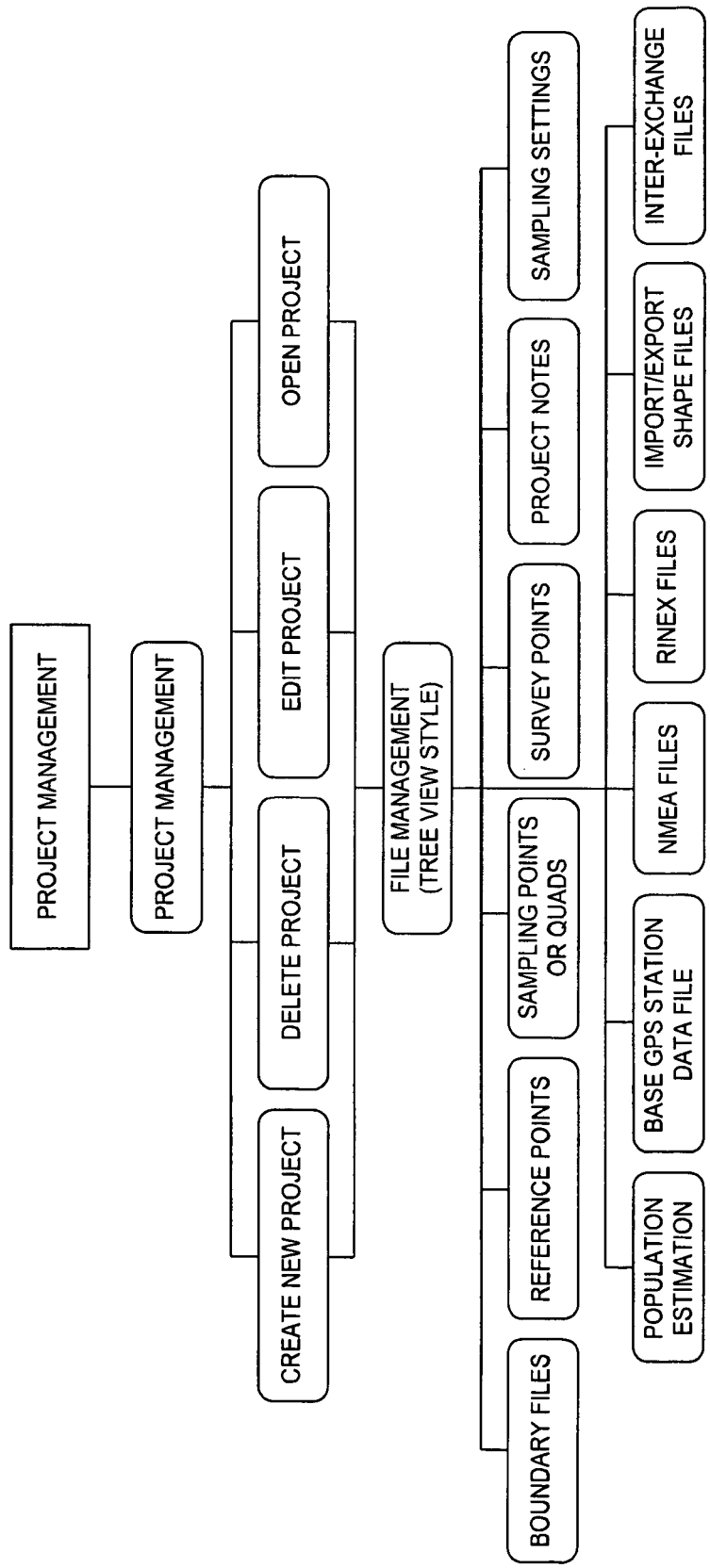
FIG. 2 illustrates a project management feature of the present invention.

2. Project Management (See FIG. 2)

Projects are used to control sessions and manage project related documents when using the rapid population assessment tool. The project management engine contains functionality for users to manage project-related information and data files. Outlined below are the required individual functions that make up the project management engine.

2.1 Create New Project

This function creates a new population estimation project. The following information is used to define a project:

Project Name
Project Description
Creator
Date Created
Organization
Data Projection
Project Notes (arbitrary text entered by the user at any time)

*The Project Management engine can also incorporate other "metadata" information specific to a particular session.

2.2 Edit Existing Project

The application allows users to edit project information. This function gives users the ability to alter any of the seven functions listed in section 2.1 for each saved project.

2.3 Delete Existing Project

The application allows users to delete an existing project. The system will prompt a warning message to the user before the project is removed from the system. If the targeted project is a currently opened project, the system will clear all files pertaining to the specific project.

2.4 Open Existing Project

The application allows users to open an existing project. Individual projects should be opened after launching the application for use.

2.5 Save Project, Associated Settings, and Data Files

Projects are saved to the local file system on the user's computer. The application saves individual components that are project specific. The ability to store the following is included:
  Project definitions: name, description, creator name, date last updated, project directory
  Boundary files (including exclusive areas) in shapefile, ASCII, or NMEA file formats
  Reference point files as shapefile, ASCII, or NMEA
  Sampling location files as shapefile, ASCII, or NMEA
  Survey location files as shapefile, ASCII, or NMEA
  Survey forms as HTML, Excel, or PDF file formats
  Sampling settings
  Survey data for individual study areas
  Population estimation results
  Last saved position and status. When the project is re-opened, its previous status will be restored to system.

2.6 View Project Summary Information

This function allows users to view all project information, including settings and associated data files.

2.7 Export Project Information

Each component of a specific project is exportable to file formats outlined in section 2.5.

2.8 Import Project Information

Each component of the project is importable from file formats outlined in section 2.5.

2.9 Print Project Information

This function allows users to print a project's information in a well-designed report format.

2.10 General Undo/Redo

Each major function in the application is associated with an Undo/Redo function. The user is able to sequentially restore previous actions executed during the program. The application allows the user multiple levels of Undo/Redo for specific functions.

2.11 Re-Projection

Any spatial datasets used by the application have the ability to be re-projected for display and visualization of the data. The application allows users to display data in different accepted projections. This feature is necessary for accurate overlays of spatial data. The application contains standard coordinate systems for users to choose from for re-projecting, taking into consideration commonly used formats throughout the world.

2.12 The User Map

The User Map is the general map display interface where spatial data is viewed by users and edited, where applicable. Individual requirements and functions relating to the User Map are outlined in further detail in section 6. When opened, each project will display its spatial layers and last extent according to the user.

2.13 Data Worksheet

The Data Worksheet is used for editing tabular data for individual projects. Features of the Data Worksheet include:
  Direct data entry (and also includes "intelligent" features such as combo/drop-down boxes, checkboxes, pre-selected data).
  Cut/copy/paste functions using standard Ctrl-X, Ctrl-C, and Ctrl-V keyboard shortcuts.
  Change data view, by moving columns. Also includes hiding columns and similar features.
  Ability to sort data by fields and/or rows
  Reorder data. The application allows users to move a row up or down from the worksheet view.

Figure 3:
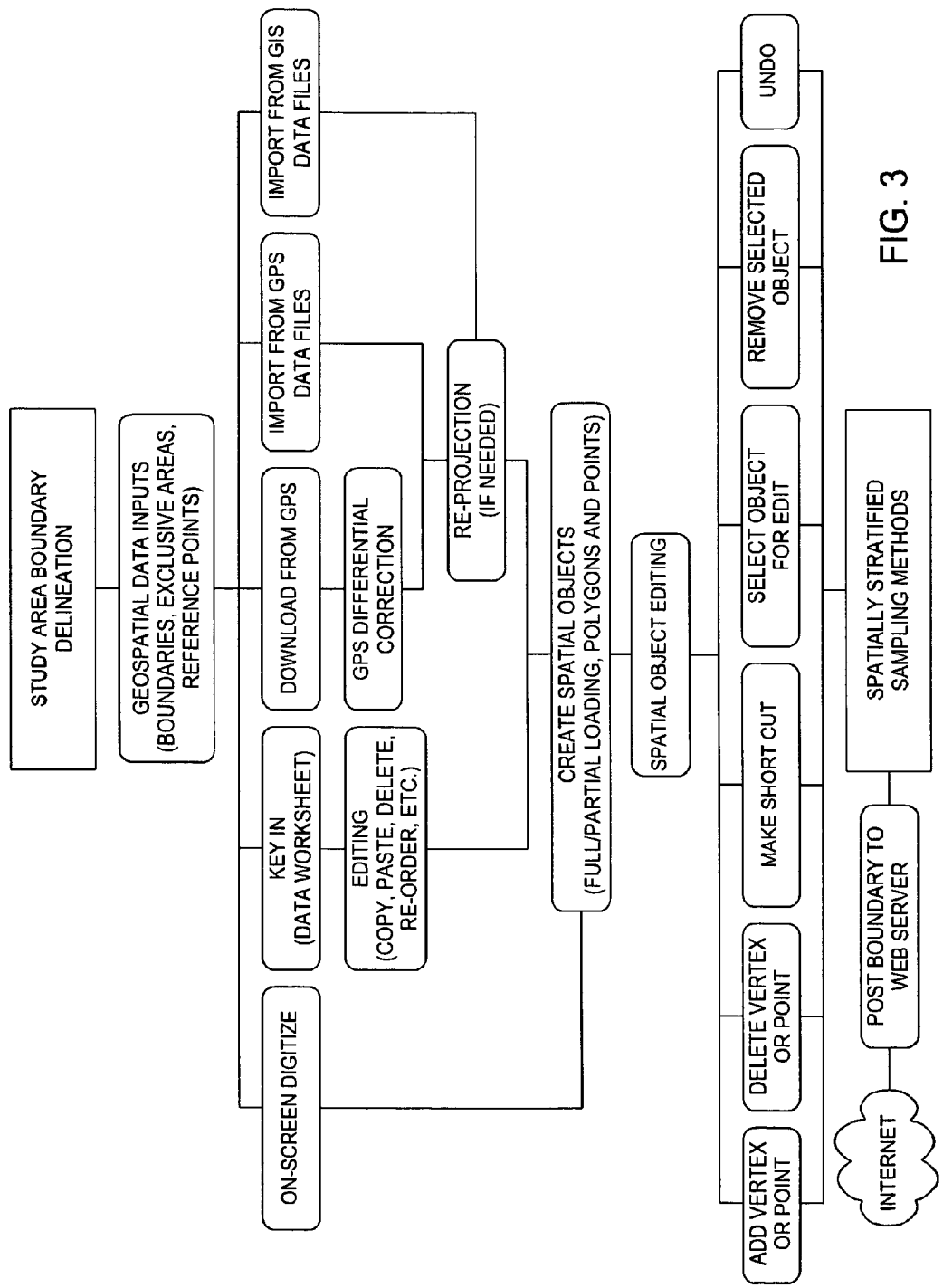
FIG. 3 illustrates a boundary delineation feature of the present invention.

3 Boundary Delineation (See FIG. 3)

The boundary delineation functionality provides comprehensive tools for users to define study area boundaries, exclusive areas, and reference points. The product allows these spatial components to be downloaded from GPS devices, entered manually using spatial coordinates, or be digitized on screen by user. Information pertaining specifically to GPS communication functions is described in Section 8.

3.1 Load Boundary Data from GPS

The application is able to load data directly from compatible GPS units. Functions include:
  Loading GPS data directly from GPS unit as full Study Boundary Area or as an Excluded Area
  Loading GPS data directly from GPS unit as a subset of a full Study Area or Excluded Area.
    Subsets of full boundaries must be indicated in some way (preferably color-coded). The application is also be able to connect multiple parts to create a single Study Boundary or Excluded Area.
  The boundary data downloaded from GPS units can be displayed in the User Map.

3.2 Load Boundary Data from GPS/GIS Files

For data gathered using GPS units that are not compatible with direct connect functionality, data files are supported. The application is able to incorporate and use GPS data files for boundary creation and display, meeting the requirements listed in Section 3.1.

3.3 Edit Boundary Data on Worksheet

Vertices of all boundary polygons are editable using the application's data worksheet. Functionality specific to boundaries should include the ability to load boundary data directly from a GPS device or associated GPS format file.

3.4 Key-in Boundary Points into Worksheet

For users without a GPS device or without a GPS connection, the application provides the flexibility to enter boundary data via the keyboard for display in the User Map.

3.5 On-Screen Digitizing of Study Area Boundaries

The application allows users to create and edit boundaries using on-screen digitizing methods. This function also allows users to load satellite imagery for viewing in the User Map to perform the onscreen assessments. Functions provided include:
  The ability to load georeferenced satellite imagery if available to assist with digitizing tasks.
  Create boundaries and exclusive areas by on-screen digitizing.

3.6 Create Study Area, Sub-Areas, and Excluded Areas

Study Areas, Sub Areas, and Excluded Areas are able to be created using the boundary creation methods described above. We define the term "SubArea" to mean areas within a delineated Study Area from a single project. The application accommodates multiple Sub Areas and Excluded Areas. Excluded Areas are regions within a given Study Area designated by the user that are removed for sampling purposes, such as areas representing lakes within a given Study Area.

3.7 Export Boundary Data File

The application allows users to export boundaries into different file formats. Formats include the following:
  Shapefile
  ASCII
  NMEA
  GML.

3.8 Study Area Analysis

The application allows users to compute the total area of Study Area polygons. The application may perform other GIS-related analysis on study areas as needed or requested. Analysis results may be saved as attributes for the particular area.

3.9 Load/Edit/Save Reference Points

Reference points allow users to create or show spatially important areas as points in the User Map. These points incorporate GIS functionality similar to Study Areas, where applicable. This includes the ability to name specific reference points and store related attribute information.

3.10 Spatial Editing Functionality

Study Areas, Sub-Areas, reference points, and other spatial objects are editable on-screen using the User Map and associated GIS functions. Specific functions include:

3.10.1 Select Spatial Objects for Editing

This function allows users to select a spatial object for editing. The spatial object includes boundary polygons, exclusive boundaries, polygon vertices, reference points, boundary buffers, sub sampling areas, and other spatial objects. The spatial objects on map can be selected in two ways: (a) by a single map click, and (b) by a user-defined polygon. Where possible, the user should be able to select more than one object at a time.

3.10.2 Add/Delete Vertices of Polygon Objects

This function allows users to add or delete vertices of a polygon object.

3.10.3 Move Vertices of Polygon Objects

This function allows users to move a selected vertex of a polygon object.

3.10.4 Create a Shortcut Between Two Selected Vertices

This function allows users to simplify an arc by creating a straight line between two selected vertices of an existing polygon object.

3.10.5 Snap Selected End Nodes Together

This function allows user to select two nodes (end points on any arc) and combine them into a single node. This node should correspond to one of the selected nodes (and should be consistently applied). The end nodes come from the same arc, which will create a single polygon. The end nodes may come from different line objects, which will create a single line.

3.10.6 Delete a Selected Spatial Object

This function allows a user to delete any selected spatial object (points, lines, polygons, and vertices) within the User Map.

3.10.7 Move a Selected Spatial Object

Spatial objects are movable by changing their position within the User Map. For objects other than points, moving should not change original shape.

Figure 4:
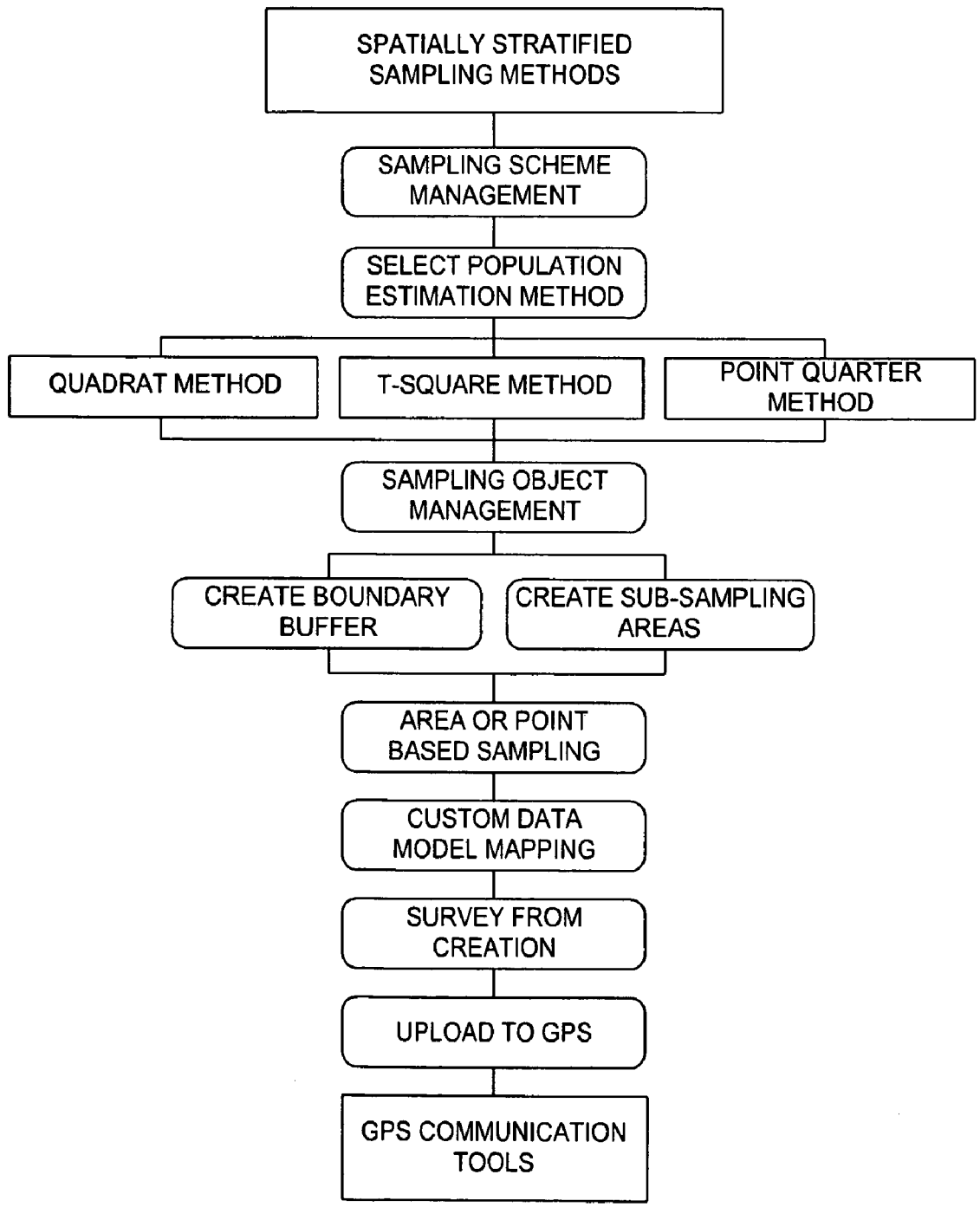
FIG. 4 illustrates a spatially stratified sampling feature of the present invention.

4 Spatially Stratified Sampling (See FIG. 4)

The spatially stratified sampling functionality provides the foundation for area and point-based population estimation. A unique spatially stratified sampling methodology has been created.
  Spatially stratified sampling methods can be classified as:
  Area-Based Sampling
    Systematic
    Random.
  Point-Based Sampling
    Systematic
    Random.
  Area-based sampling methodology is used by the Quadrat Population Estimation technique. Point-based sampling method is utilized by the T-Square and Point Quarter Population Estimation techniques.

4.1 Sampling Settings

The software allows users to create comprehensive sampling schemes. Each Study Area has a single sampling scheme associated with it. In a project with more than one Study Area (sub-areas), each may have a distinct sampling scheme.

The procedure for sampling setting includes the following steps:
1) Select one or more Study Areas for sampling
2) Select a sampling method: Quadrat, T-Square, or Point-Quarter methods (others possible)
3) Define sampling size. For point-based estimation methods this is simply the number of points to be generated. For area-based estimations, the width and length of each sampling area must be defined. There may be additional methods required in the future (such as transect-based methodologies).
4) Select a sampling type: systematic or random.

4.2 Define Boundary Buffer

In order to ensure usability of all sampling locations, the system allows users to create a buffer in which no sampling locations will be located. If a buffer is created, all sampling operations will be restricted to areas in the polygon not covered by the buffer.

For Study Area boundaries, the buffer shall be inside the chosen polygon.
For excluded areas, the buffer shall be located outside the area, surrounding it.

4.3 Define Sub Sampling Areas for Multiple Frequency Sampling

This function allows users to define sub-sampling areas by user-defined polygons within a given Study Area. Currently there is a three sub-area limit in the prototype; however, the number of sub-areas may be unlimited.

4.4 Sampling Method Setting and Parameter Management

Meaningful defaults are given for each Sampling Method, where possible.

For advanced users, the system also provides tools for comprehensive sampling method setting, including the ability to alter detailed sampling algorithms (such computation iteration), where applicable.

4.5 Define the Fields for Data Collection

The system allows users to define fields (column names within the data worksheet) for data collection. To simplify this process, two types of fields are defined in the system: 1) a NUMBER type field and 2) a TEXT type field. The system also provides some basic fields for use by default.

4.6 Execute the Spatial Sampling

The system generates sampling locations for the user. Their location depends on the sampling parameters chosen. Sampling locations and identifying labels are displayed as a layer on the User Map.

4.7 Sampling Result Management

The system is able to export results (sample locations) into any of the following formats:
Shapefile
ACSII
NMEA
GML.

The system also is able to upload sampling outputs to a connected GPS unit. The system divides the total sampling scheme results into parts for upload to multiple GPS units. This allows for collaborative division of survey points among multi-member teams.

4.8 Create the Survey Form

The system is able to create a field survey form for data entry in HTML, Excel, or PDF formats after the sampling scheme is executed. The survey form provides sampling location information, including directions from reference points to each sample location, and blank tables for data recording. The system also allows users the ability to print the generated forms for use out in the field.

The system is able to select sub-sets for the creation of survey forms. This enables a project coordinator to send multiple workers into the field to collect data for specific locations.

4.9 Sampling Scheme Management

The application is able to manage each Sampling Scheme created by the user. A Sampling Scheme includes the following information:
Sampling-specific parameters (number of points, confidence interval, etc.)
Survey fields to be collected
Estimation model used.
Management of Sampling Schemes include the following functions:
Save to file under a name prescribed by the user.
Load from file with ability to browse associated directories.
The system may include pre-defined Sampling Schemes for the user to load. These pre-set schemes may be chosen by the user to simplify procedures.

Figure 5:
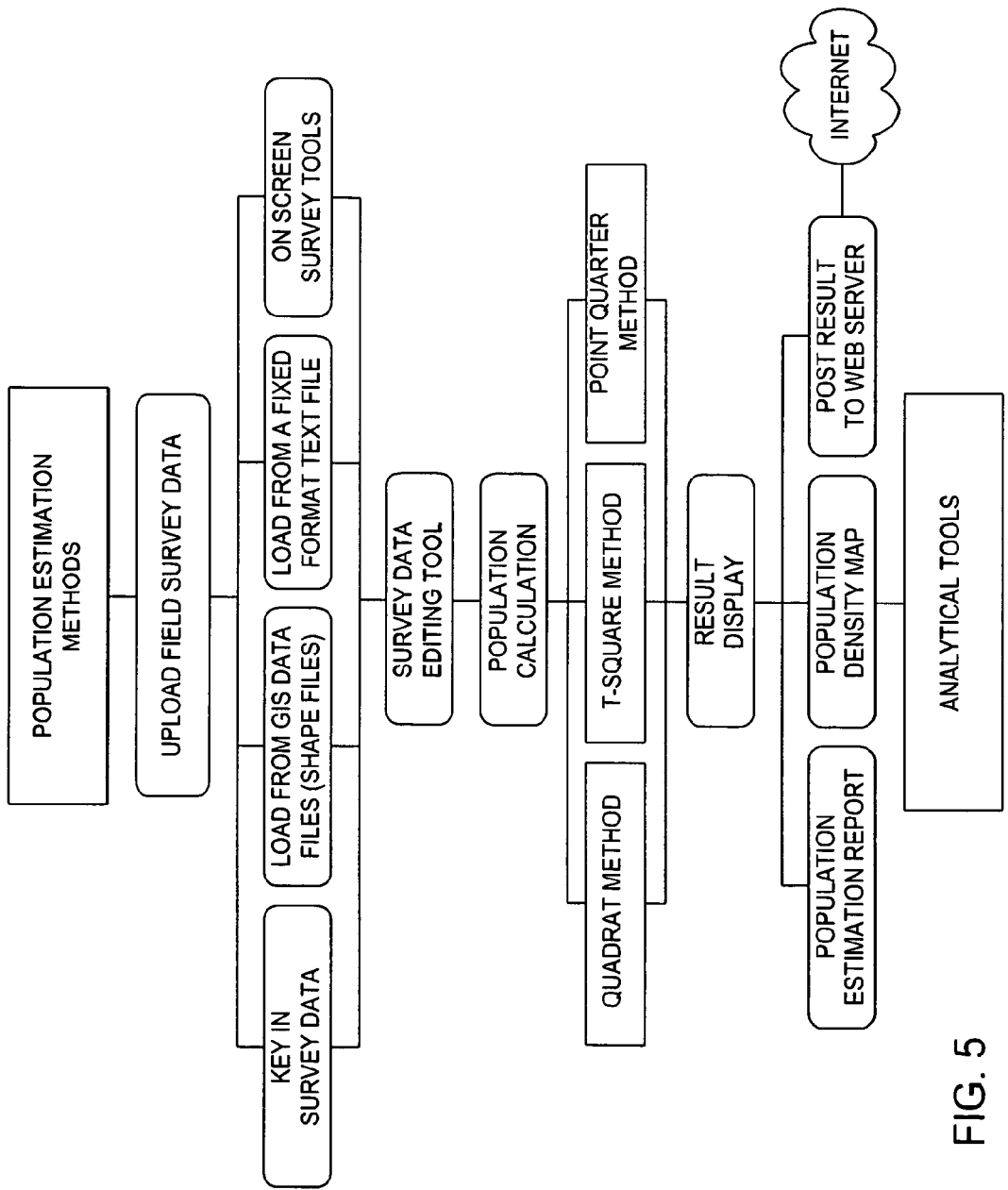
FIG. 5 illustrates population estimation methods of the present invention.

5. Population Estimation (See FIG. 5)

5.1 Input Field Survey Data for Population Estimation

Data collection at each of the generated Sampling Locations is necessary for population estimation. The collected data must be input to the program in one of the following ways:
Input by tabular worksheet. This function supports conversion from paper surveys.
Individual data entries through an input format. Here, the application allows users to navigate the data using "next" and "back" functions.
Import of structured text (CSV or potentially GML) file.
Import of GIS data file (Shapefile).
On-screen input using User Map (see examples below).
All data input to the application is editable using a Data Worksheet (2.13).

5.2 Select Data Fields for Population Estimation

Where the project contains survey data in multiple fields, the user is able to select a limited number of fields to use for each estimation calculation.

5.3 On-Screen Data Collection Functionality Examples

The application provides effective procedures for users to perform tasks at different sampling locations, navigate through survey points, generate distance measurements, and store them in associated data tables automatically.

Figure 6:
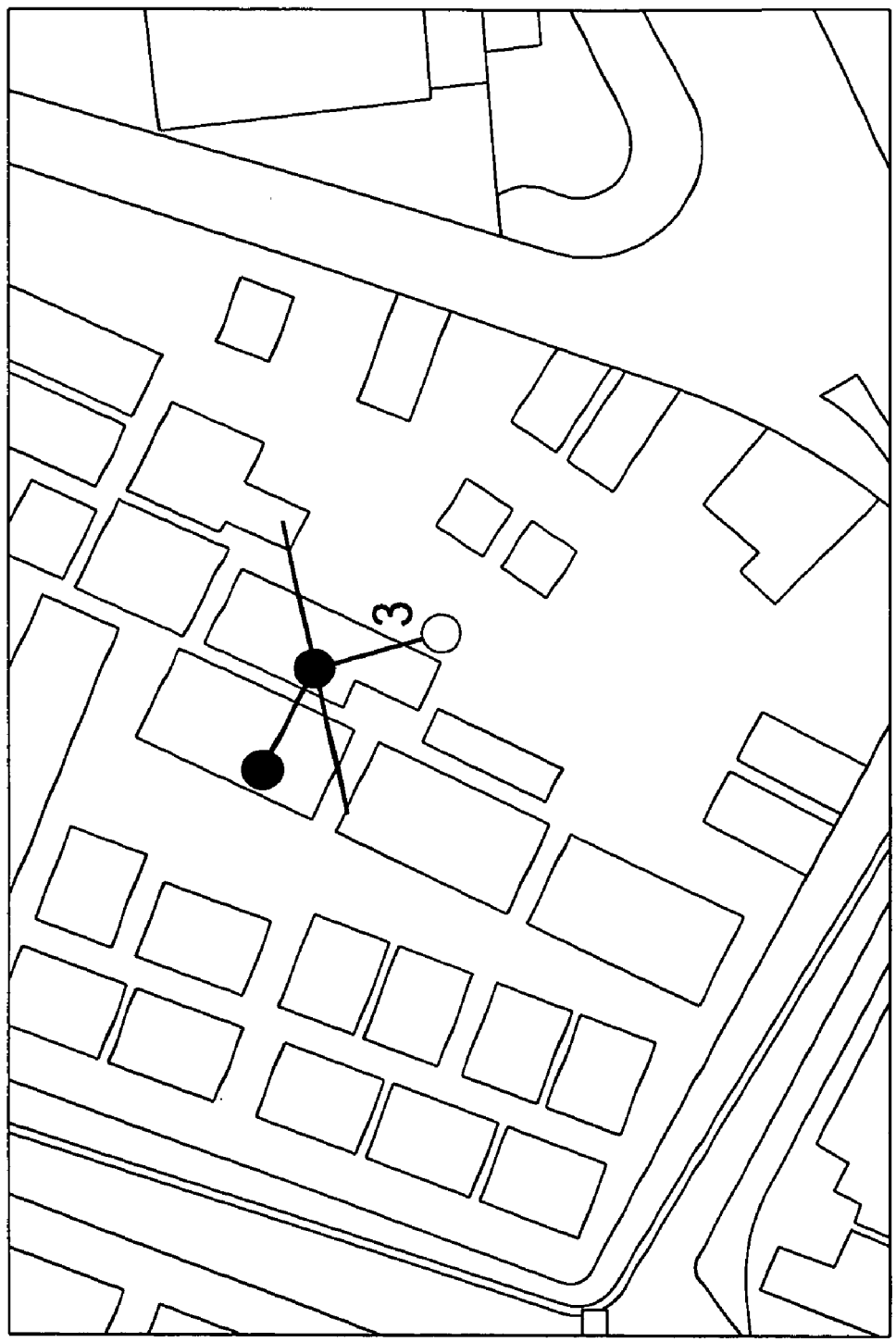
FIG. 6 illustrates an on-screen survey for the T-Square method of the present invention.

5.3.1 On-Screen Survey for T-Square Method (See FIG. 6)

This function automatically zooms to a selected sampling point and highlights it. The system allows users to collect two map points (such as identifiable dwellings) for the distance computation. After the first point is chosen, the system automatically draws reference lines to help a user to determine the second map point with an appropriate angle.

Figure 7:
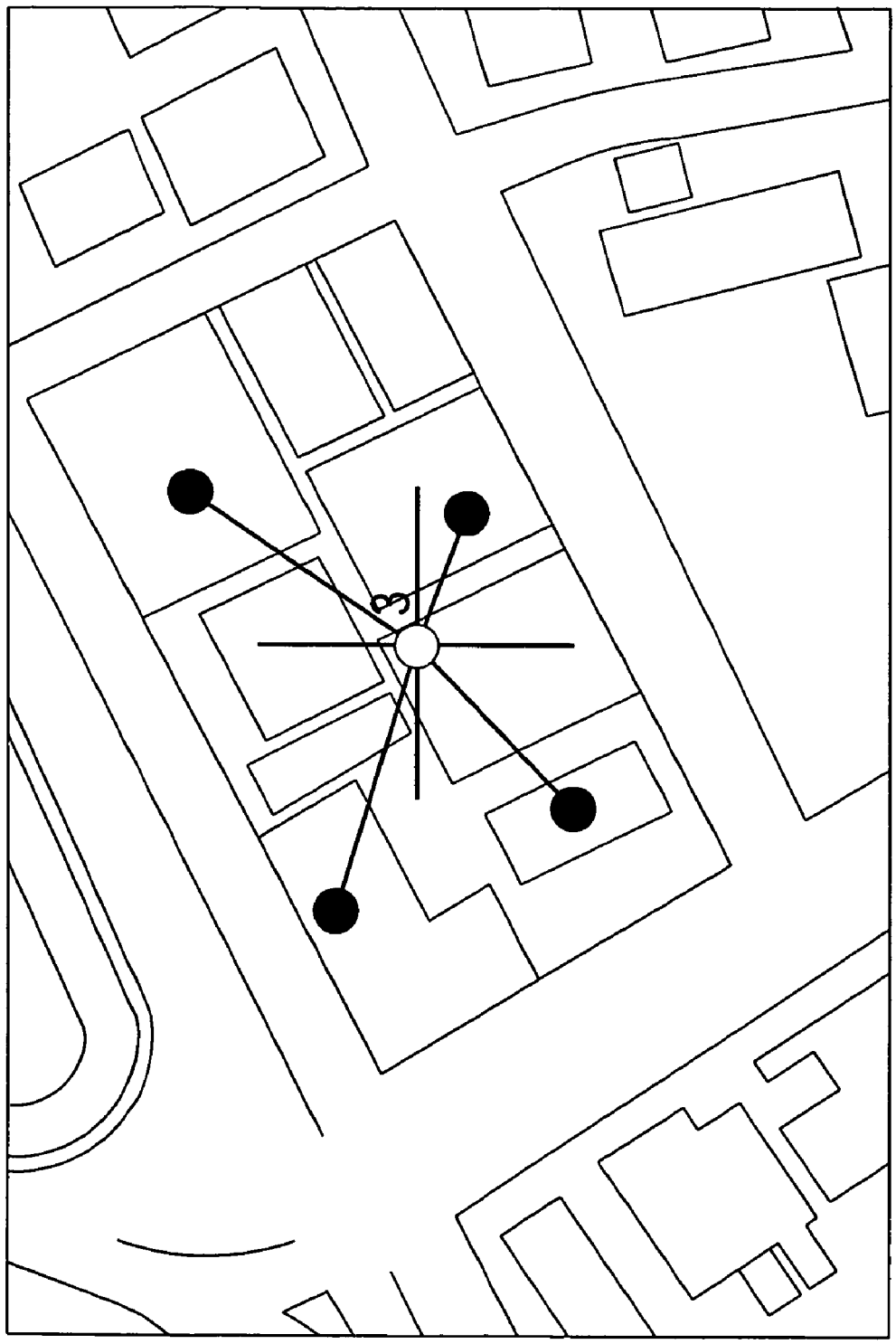
FIG. 7 illustrates an on-screen survey for the Point Quarter method of the present invention.

5.3.2 On-Screen Survey for Point Quarter Method (See FIG. 7)

This function automatically zooms to a selected sampling point and highlights it. Two reference lines are drawn at the sampling point to represent four quads for map point determination. The system allows users to collect four map points for distance computation. Based on these reference lines, users can collect one map point (the nearest housing unit) from each quad. The system automatically computes the distance between the map points and the sampling point, and stores results in the data table.

Figure 8:
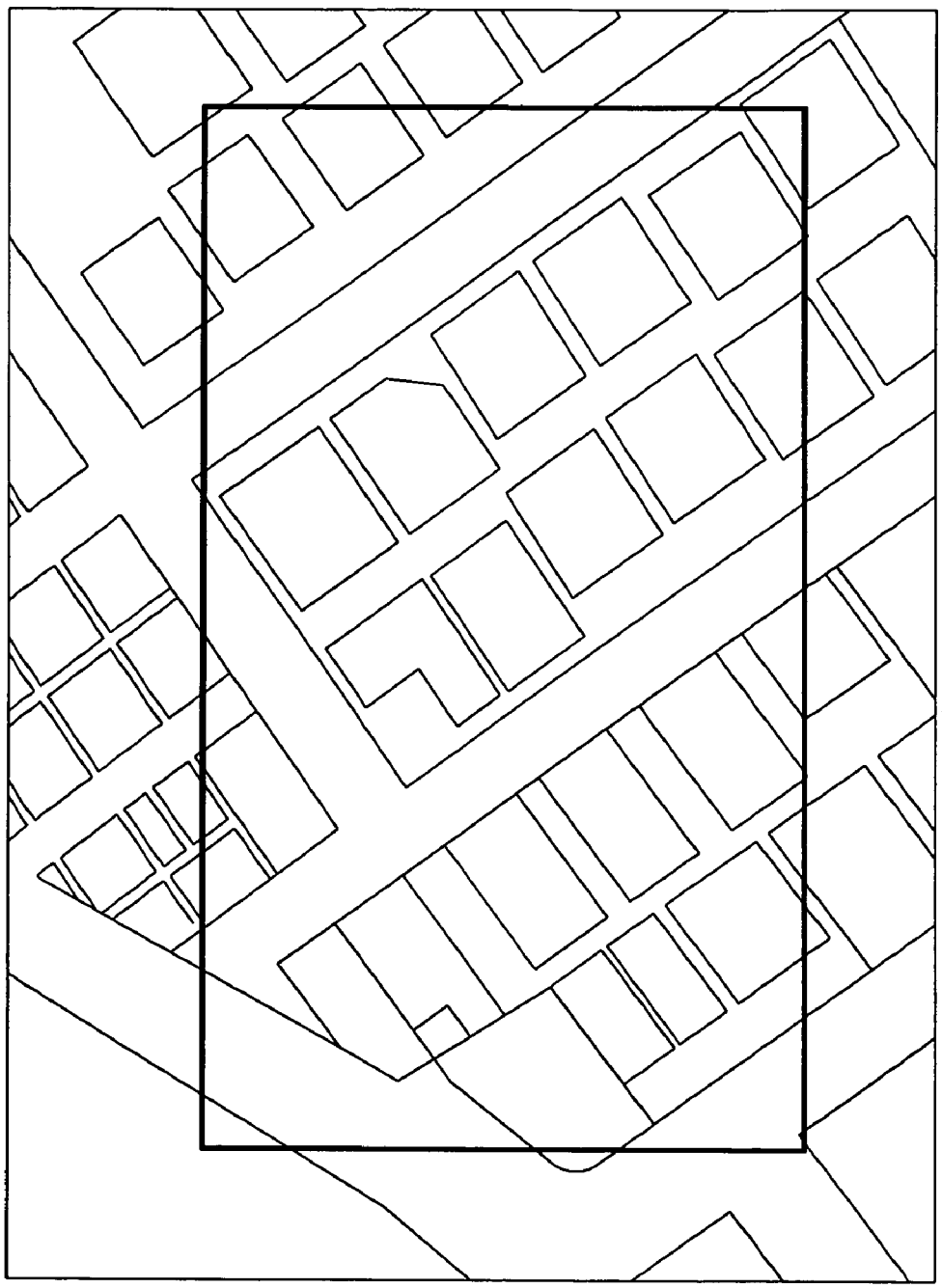
FIG. 8 illustrates an on-screen survey for the Quadrat method of the present invention.

5.3.3 On-Screen Survey for Quadrat Method (See FIG. 8)

This function automatically zooms to currently selected sampling quad and highlights it. Based on satellite imagery, a user will determine how many housing units are within the sampling quad area, entering this number into the system.

5.3.4 Enter Average Number of People Per Housing Unit (Optional)

When actual population data for the targeted housing units is not available, users can input the average number of people per housing unit from historic data or other sources to perform the population computation. This function allows users to complete rapid population estimation for a given area when minimal data is available.

5.4 Execute the Population Computation

Based on user-defined data or data collected from a Study Area, the population computation can be executed. The system will display the sampling scheme summary and population results in a report format on screen. The report is also viewable in HTML and/or PDF formats.

Figure 9:
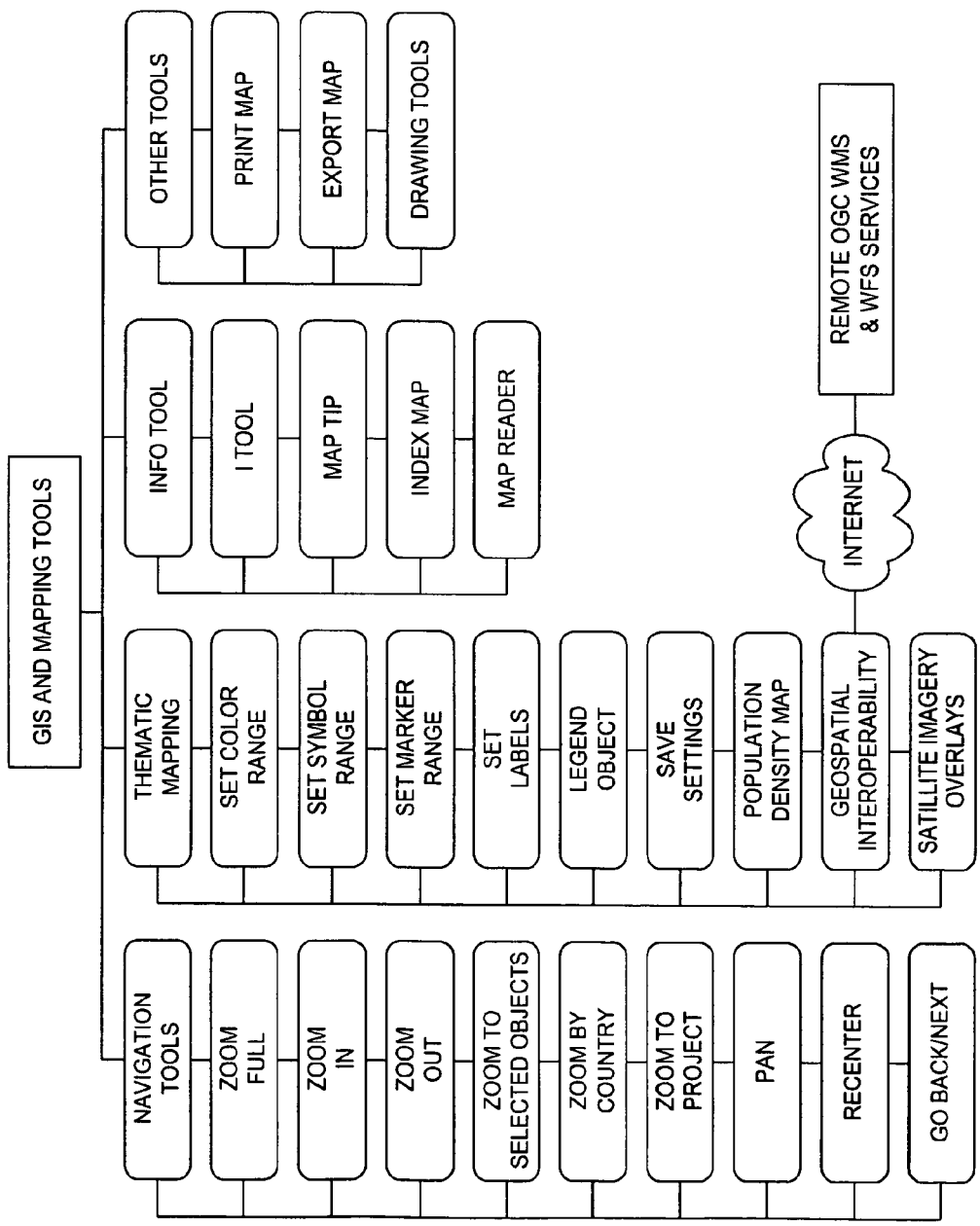
FIG. 9 illustrates GIS and mapping tools which may be used to map and analyze spatial data in accordance with the present invention.

6. User Map and GIS Functionality (See FIG. 9)

The application provides the basic GIS-related tools needed to map and analyze the spatial data used by the application.

6.1 Base Data

The application includes a number of base data layers for users to display. Some data layers will be automatically added to a User Map when an existing project is opened or new one is created. Currently, a data layer depicting countries of the world is the only data source included. The ability to include additional standard data layers is also included.

6.2 Layer Management

Layer management functionality includes:
Add a Layer, including both vector and raster-based datasets. Supported vector GIS formats include the following:
ESRI Shapefile
OGC WFS format (GML).
Layer visibility and scale control: Methods exist within the application to allow for turning on and off the visibility of specified data layers. Also, the scale at which specific data layers appear within the User Map should be controllable. Functions shall also exist to remove one or more layers from the User Map view.

6.3 Map Navigation

General navigation around the User Map includes these common GIS functions:
Zoom In by map click and drag box
Zoom Out by map click (and a drag box)
Gazetteer: Zoom by place name, depending on place names/data layers available. The Gazetteer can be used even if the vector Layer is not actually on the current Map.
Zoom to a defined project object (such as boundary extent)
Pan/Re-center
Move back to a previously defined map position (at least 20 map positions should be stored and re-cycled)
Move forward to a previously defined map position.

6.4 Thematic Mapping

The system allows users to define the following parameters for vector-based data layers:
Custom attribute and color ramp setting
Custom map style and pattern setting
Labeling by attributes
On-the-fly custom points (graphics) to be drawn on the on User Map
Map legend displaying all current data layers and/or symbology.

6.5 Contour Map Generation

This function is designed to create a contour map based on point data (Z values). This function can be used to create population density maps based on point data collected from a study area.

6.6 Print and Export Map

Functionality includes:
Print Map at any scale
Export map to different raster formats: png, jpg, and gif
Export individual vector data layers to ESRI shapefiles, wherever applicable.

6.7 Save Map Setting and View

This function allows a user to save a current map setting (data layers used and their individual settings, including current extent and position on the User Map).

6.8 Load Existing Map

The user is able to load an existing map including its associated data layers to the User Map.

6.9 Info Tools

Other GIS-based tools implemented in the User Map include, but are not limited to:
Info Tool: display attribute information for selected spatial objects
Index Map: display current map extent on a world map
Map Reader (must attempt Section 508 compatibility at the mapping level).

Figure 10:
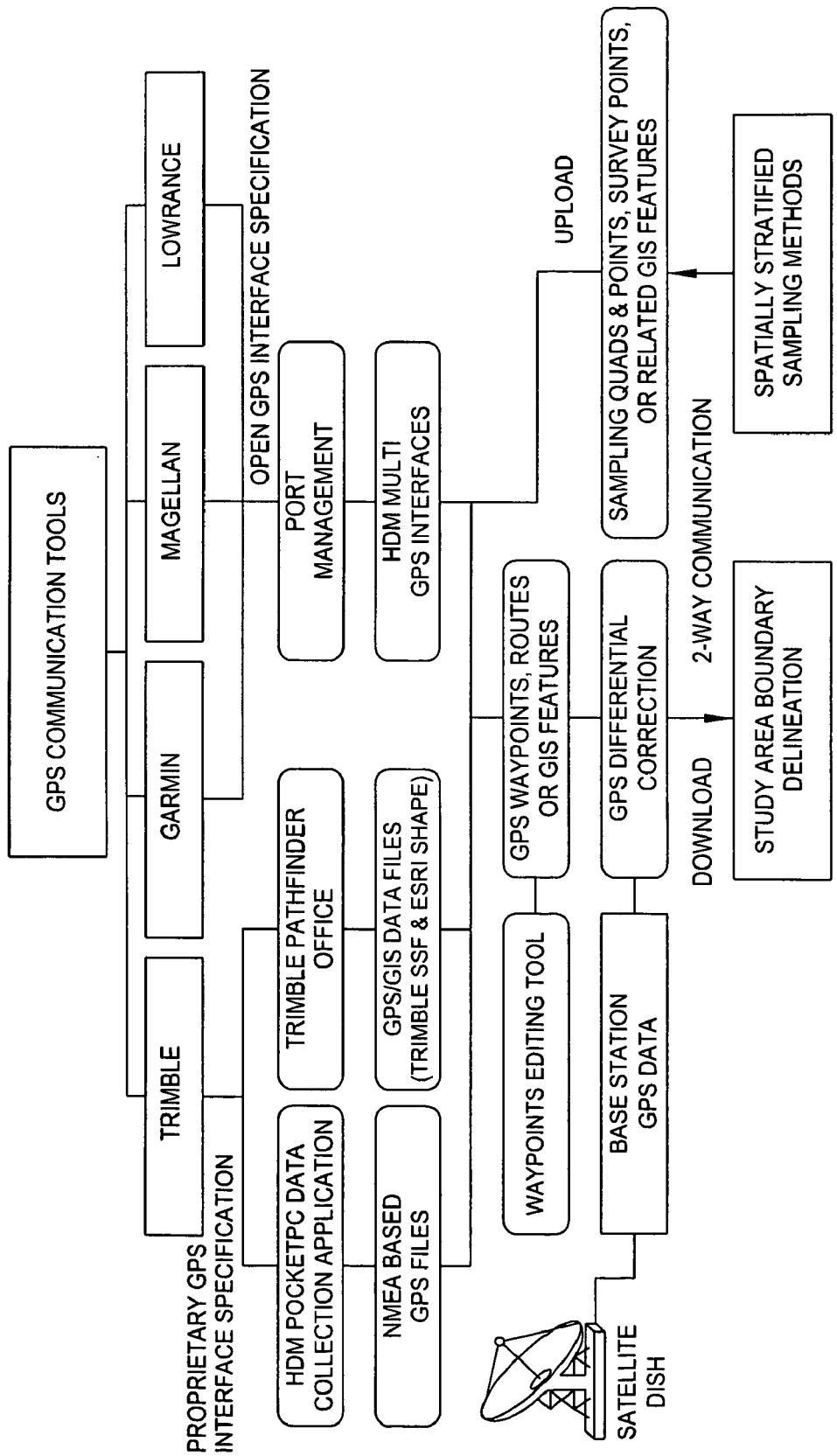
FIG. 10 illustrates GPS communication tools which may be used in accordance with the present invention.

7 GPS Communication (FIG. 10)

GPS communication functionality encompasses two aspects:
Direct Communication: For GPS devices with open specifications for application protocol, the product will communicate directly with the device for the upload and download of waypoint and/or route (line, polygon) data. At this time, manufacturers supporting this method include Garmin, Magellan, and Lowrance. More may be added as identified.
File-Based Communication: For GPS devices without open specification for application protocol, the product will rely on a common file interface to communicate with the devices. File interface will depend on the unit/manufacturer, but will resemble the NMEA standard format. GPS manufacturers known to operate using this method include Trimble.

Figure 11:
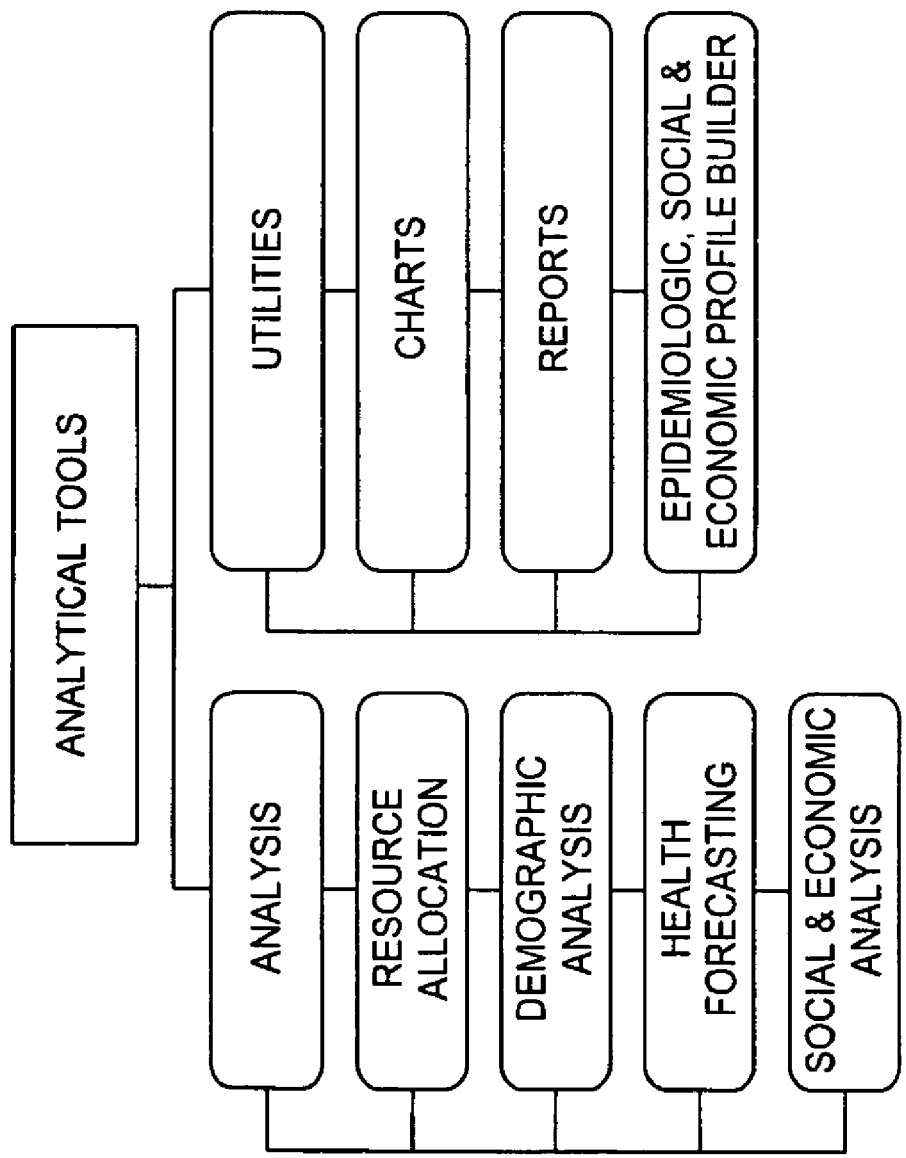
FIG. 11 illustrates analytical tools which may be used in accordance with the present invention.

8 Analytical Tools (FIG. 11)

When the population estimation is performed, many comprehensive analyses can be applied. Analyses can currently be grouped into five major areas. Listed below are the application's general requirements. Each analysis is available in three forms:
Tabular: This functions as the compiled Data Worksheet, but in a read-only mode.
Graphical: Charts and/or graphs are generated.
Report: Analyses are printable and may include information interpreting the results. Reports are created in HTML or PDF formatted text.

8.1 Population Profile Builder

This function allows users to build epidemiological, demographic, and social and economic profiles for resulting population. Users are able to define a profile type, profile name, and associated ratio or rate for each population interval. The ability to add/remove/edit profiles from the system is also incorporated.

8.2 Resource Allocation Analysis

This function allows users to analyze itemized resource needs for relief activities by defining quantities and costs of relief supplies and apply them to a specific Study Area.

8.3 Epidemiological Analysis

This function allows users to analyze epidemiological impacts for the displaced population, and predict outcomes.

8.4 Demographic Analysis

This function allows users to analyze demographic patterns for the population within a Study Area and predict changes of demographic composition.

8.5 Social and Economic Analysis

This function allows users to analyze social and economic impacts for the specific population and predict changes in these attributes.

Figure 12:
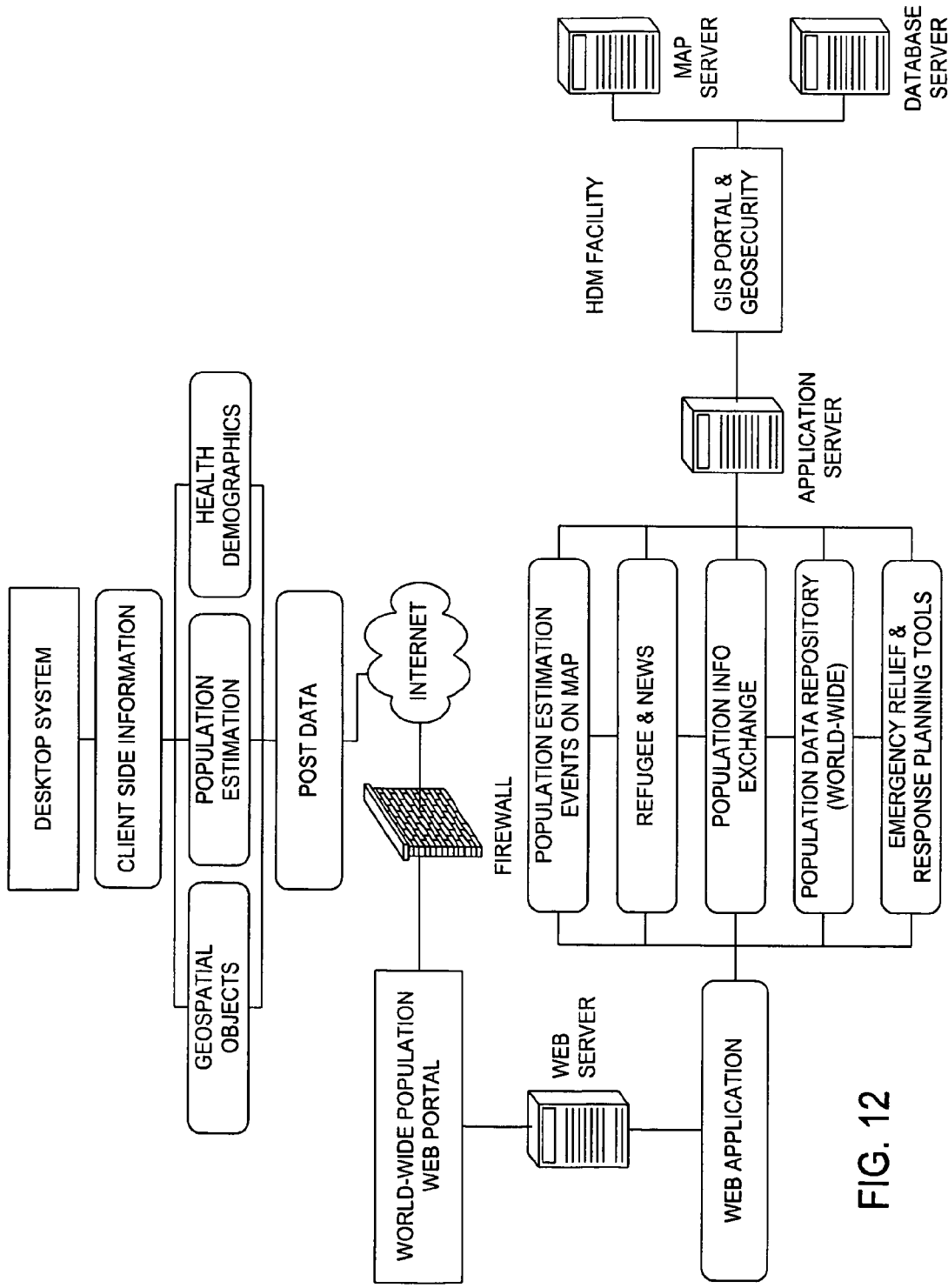
FIG. 12 illustrates a system for exchanging population information in accordance with the present invention.

9 GIS Interoperability and Web Service Integration (See FIG. 12)

The application is able to utilize GIS data for the User Map through various web services specifications, including the required parts of the WMS (web mapping service) client specification. No data serving is required by this application, except to upload data and results to a future web page design.
The application is designed with connectivity to and from remote sources in mind.

10 Worldwide Population Web Portal (See FIG. 12)

The goal of the worldwide population web portal is to promote world communities to exchange and share population information, supporting efforts for humanitarian relief activities. In general, the web portal includes:
Displays worldwide events for population studies
Refugee and humanitarian relief news
Platform for population data exchange
Resources and tools for humanitarian emergency planning and responses
Web hosting infrastructure and capabilities.

11 Technologic Summary of Methodologies in CensusView™

CensusView™ is a powerful rapid population assessment system. The system uniquely integrates geographic information system (GIS) and global positioning system (GPS), remotely sensed imagery (including satellite imagery), advanced population estimation research, and spatially stratified sampling methodologies for rapid population assessment. The system can significantly increase productivity and accuracy of field population assessment, reduce field population survey risk during complex humanitarian emergencies (CHEs), and help in making effective decisions on relief efforts. The system is the first tool that standardizes population estimation procedures crossing international boundaries, and that integrates world-wide geospatial information with population estimation through interoperable web services crossing multiple geospatial data platforms, international boundaries, and world-wide relief organizations.

Technical Highlights:
Advanced GIS object model and multiple GIS package integration capabilities
Most comprehensive population estimation methods based on real world experience
Multiple spatial sampling models, covering area-based and point-based sampling methodologies Multiple-area samplings with different sampling frequencies Reduction of unusable sampling points or quads near specified population area boundaries Multiple population estimation methodology: quadrat, t-square, and point quarter methods Effective PDA and Desktop Software Communication and integration.

CensusView™ can assist CHE specialists with the following functions rapidly and effectively:

Investigate disease outbreaks and reduce infectious disease transmission

Identify vulnerable populations and tailor programs to meet population specific needs Calculate rates of disease in surveillance systems to direct programs Assess the availability of water, fuel, and other resources Assess the population's accessibility to health, sanitation, and other services.

Figure 13:
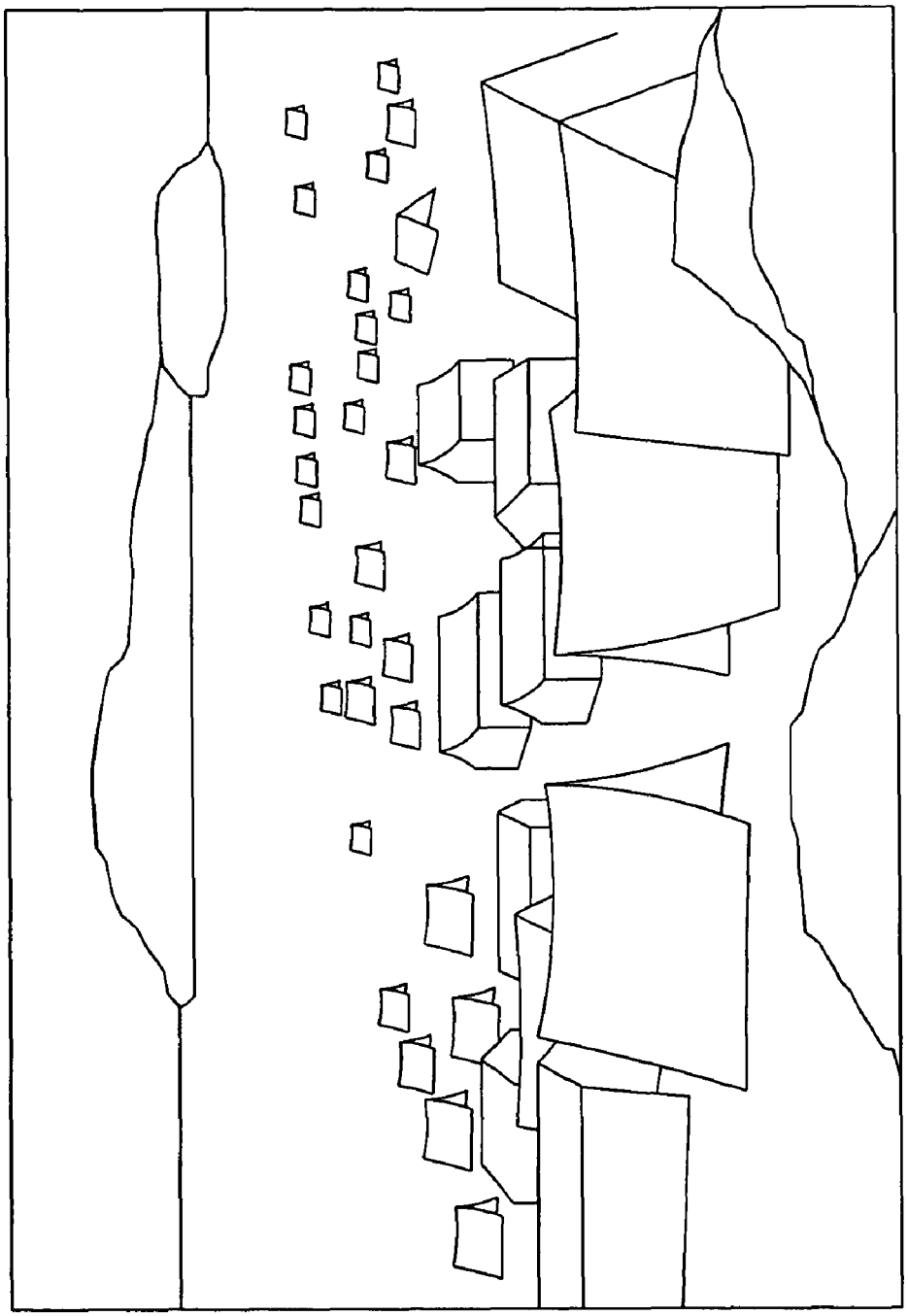
FIG. 13 illustrates a geographic location.

See FIG. 13.

Figure 14:
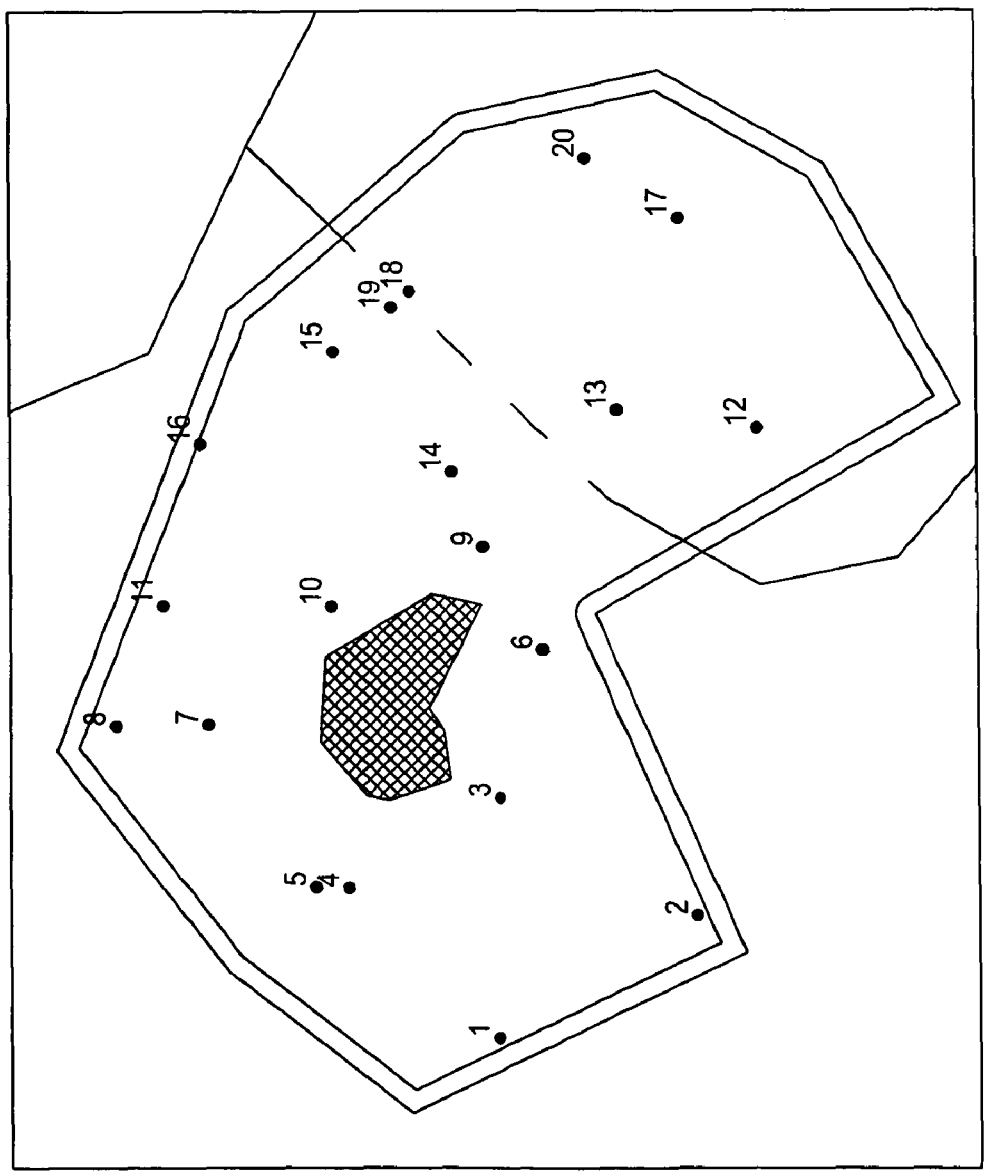
FIGS. 14 and 15 illustrate the spatially stratified random sampling method of the present invention.

A. Spatially Stratified Random Sampling Algorithm (See FIG. 14)
1. The novel spatially-random stratified-sampling methodology has the ability to simulate complex boundary conditions in the field, including
    a. Develops boundary "inner buffer polygons" to avoid creating unusable sampling points
    b. Generates "exclusive area polygons", to define unwanted areas for sampling within study area polygons
    c. Generates "cluster boundary polygons" for different frequency samplings, to enable complex population cluster sampling.

The methodology ensures that the systems' random sampling has the following characteristics:

the random sampling locations are spatially stratified, ensuring that the sampling location geographically represents the study areas, and the spatial bias of randomness is minimized, ensuring that the designated area within the study area boundary has equal probability for random sampling.

Figure 15:
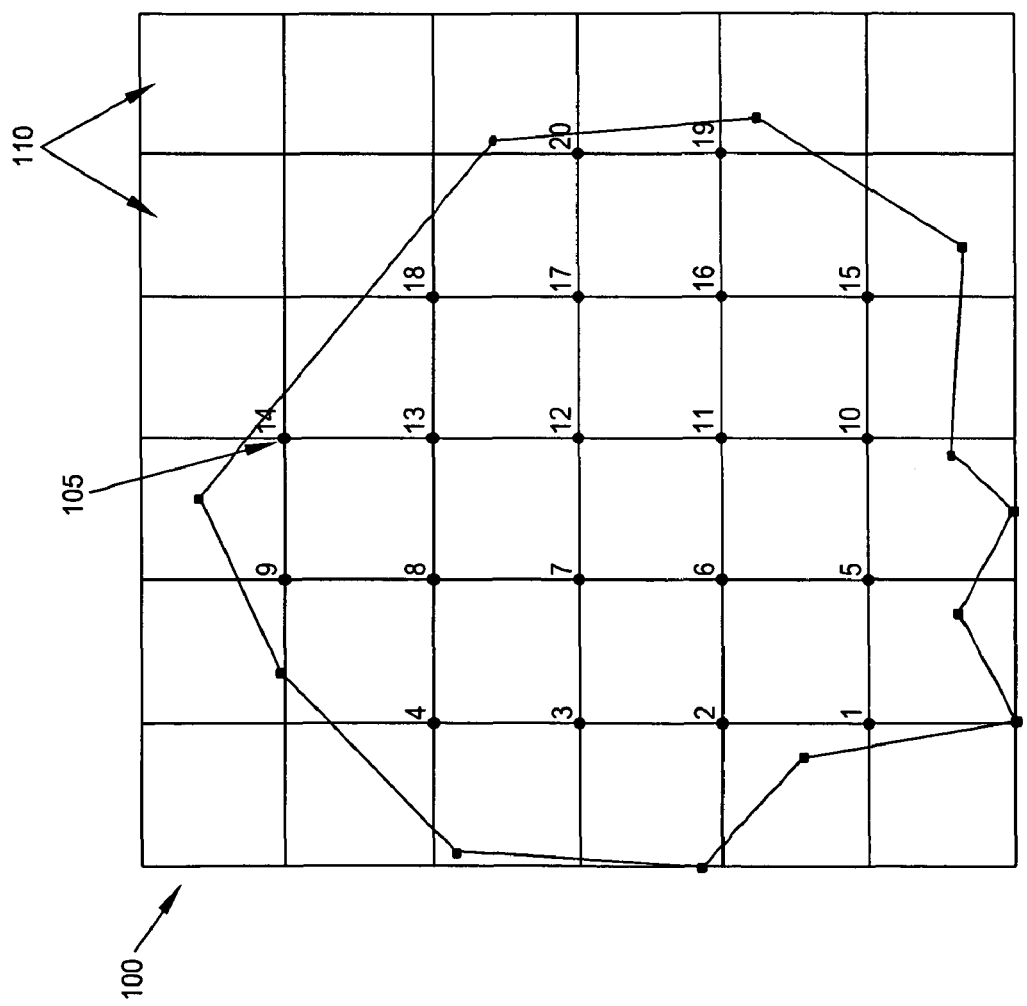

The spatially-stratified random-sampling methodology is implemented by the following procedure:

1. Create a systematic grid 100, containing exact number of target grid points 105 within the study area. An example grid layout is shown in FIG. 15.
2. Systematically divide each grid cell 110 into an infinite number of very fine sub-grid cells (for example, 1,000×1,000=1,000,000 cells). For each grid cell, sub-grid cells are created from the left to right and from the bottom to top. Higher numbers of fine grid cells help's to ensure that any given cell within the study area has an equal possibility for receiving a random sampling.
3. Assess and list all sub-grids that intersect the study area. The list of intersected cells has the same sequence as when the grid and sub-grid cells were created.
4. Divide the sub-grid list into a number of sections. Each section contains equal numbers or near equal numbers of sub-grid cells. The total number of sections is equal to the exact number of targeted sampling locations.
5. Randomly select a sub-grid cell from each section (group) of sub-grid cells defined above.
6. This method is computationally intensive. An optimal computation procedure is developed in Java to achieve the computation goal with very good performance.

Figure 16:
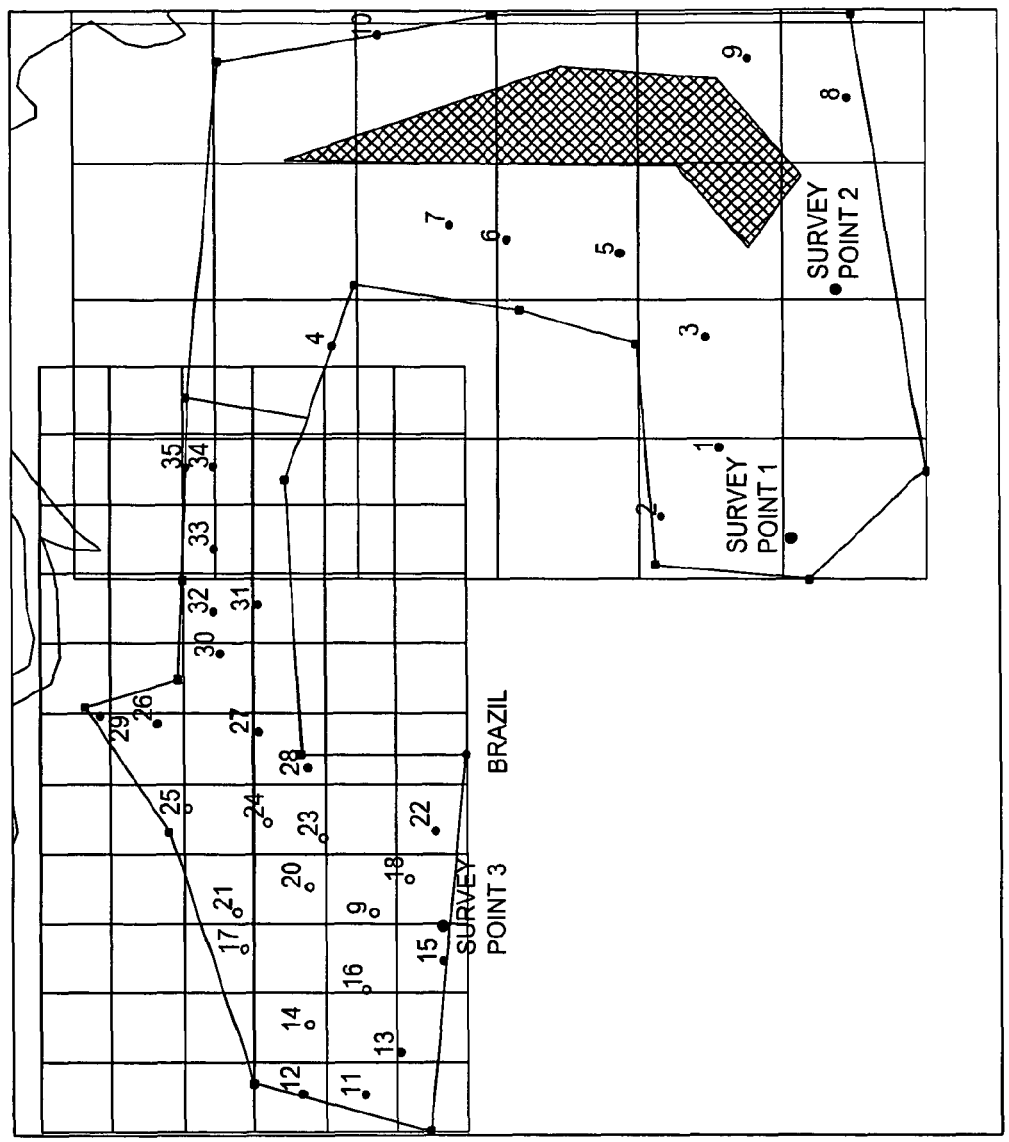
FIGS. 16-18 illustrate the comprehensive population estimation method of the present invention.

B. The Most Comprehensive Population Estimation Methodology Integration (See FIG. 16).

Traditionally, population estimation under complex humanitarian emergencies is carried out by using a manual procedure from data collection to population computation. There is no such tool that is capable of standardizing the procedure, then managing and integrating information and technologies from different steps of the population estimation process together. In most cases, data are entered into spreadsheet type software, and population computation is done in an inconsistent fashion. CensusView™ is the first system that integrates and computerizes all of the following population estimation methodologies and procedures. Population estimation methods implemented into current version of CensusView™ include Quadrat Method
T-Square Method
Point Quarter Method
Transect Method.

Geographic information systems (GIS), global positioning systems (GPS), and satellite imagery technologies are integrated into different steps of the methods used by CensusView™, making the entire process easy to learn, operate, manage, implement, and analyze results in the field.

C. Satellite Imagery Based On-Screen Population Survey Methodology

When deploying personnel into critical areas is not feasible, CensusView™ can load commercially available satellite imagery into its GIS framework, allowing users to demarcate dwellings and apply spatially-stratified sampling procedures with predefined estimates to ascertain the overall population in a defined area. Results from this "On-Screen" Survey are achievable without the need for a field survey. The time consumption for the population assessment can be reduced from a number of days or weeks to a few minutes. The system can help users automatically navigate through sampling locations for distance measurement automation, data input, and visualization. The system creates "roof-top accuracy" for associated distance measurements. During the assessment process, the system draws reference lines to guide the user to pick housing units, buildings or other structures based on the user-selected population method.

Figure 17:
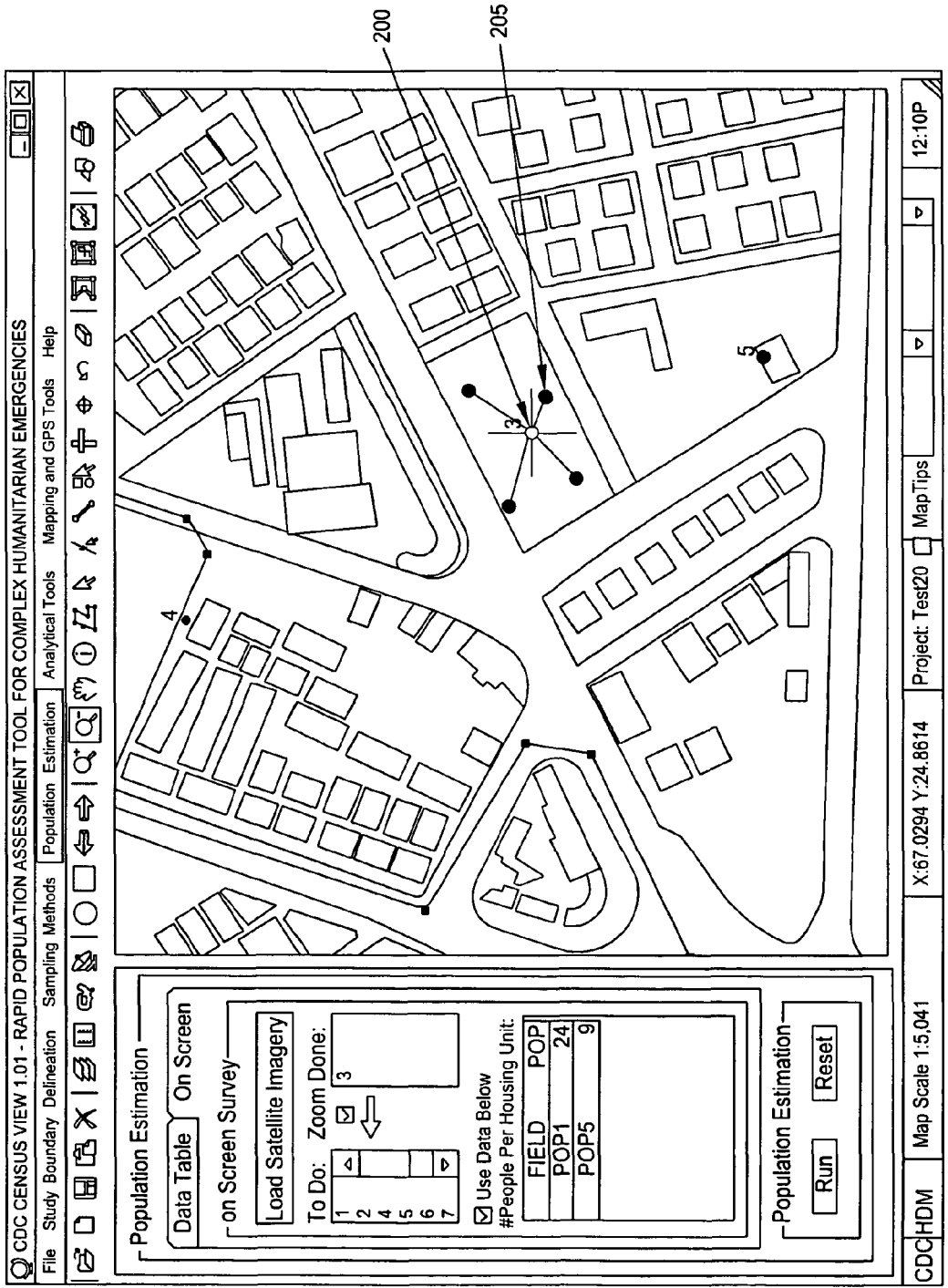

For example, in the Point Quarter method, a user clicks on the nearest house 200 in each quad (four clicks on the map). The system automatically computes the distances among the sampling point 200 and survey points 205, and adds this information into the database. The option of "map zoom" allows user to automatically zoom to selected sampling location. See FIG. 17.

Figure 18:
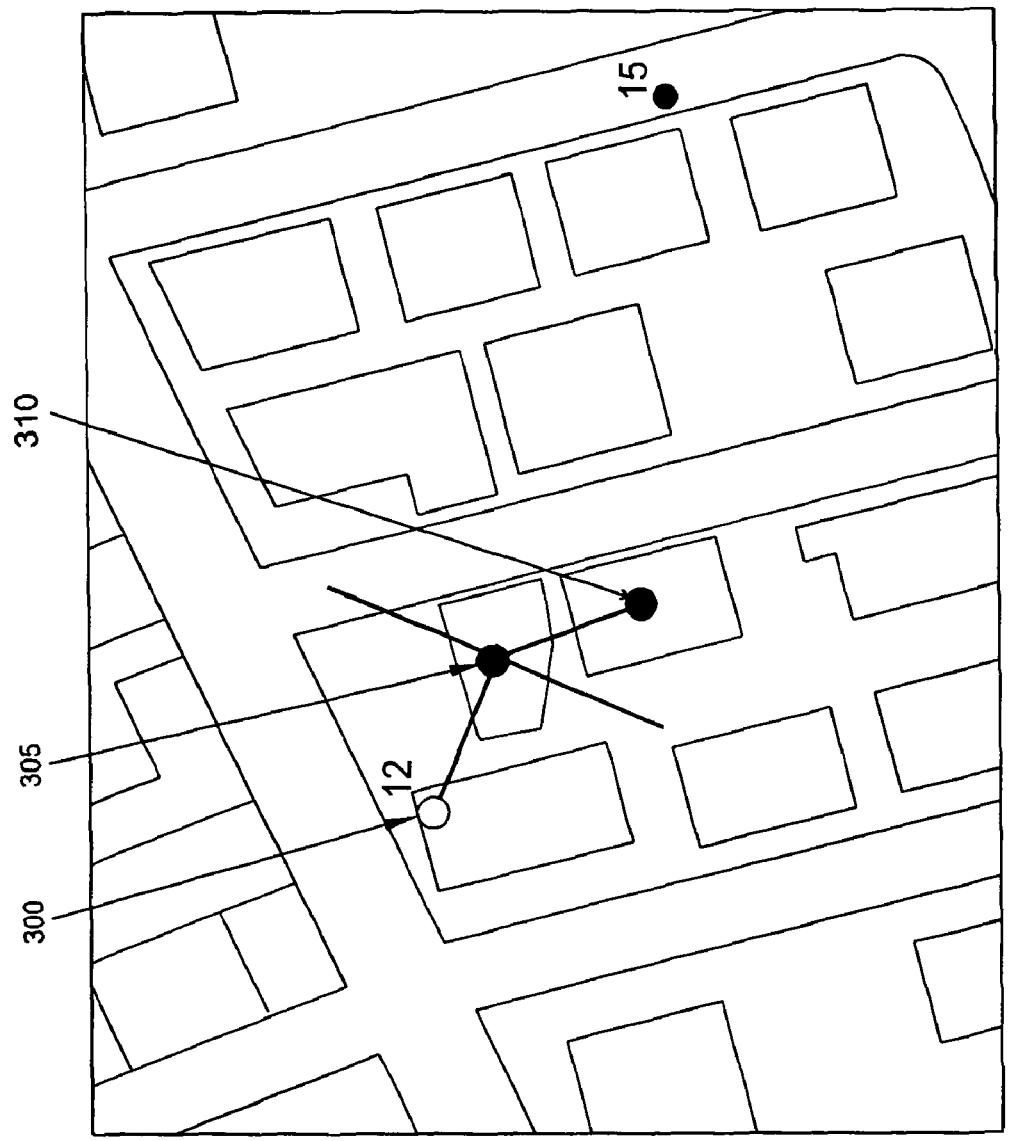

For the T-Square method, only two survey points need to be defined, and other procedures follow the same methodology as the Point-Quarter method described above. The system draws a reference line after a first point 300 is defined. Users use the reference lines to make sure that the angle among the sampling point, the first nearest house to the sampling point 305, and the first nearest house to the first survey point 310 is greater than 90 degree. See FIG. 18.

CensusView is the only system that integrates measurement procedures, distance computations, sampling rules, and methods with high-resolution satellite imagery technology for population estimation.

Figure 19:
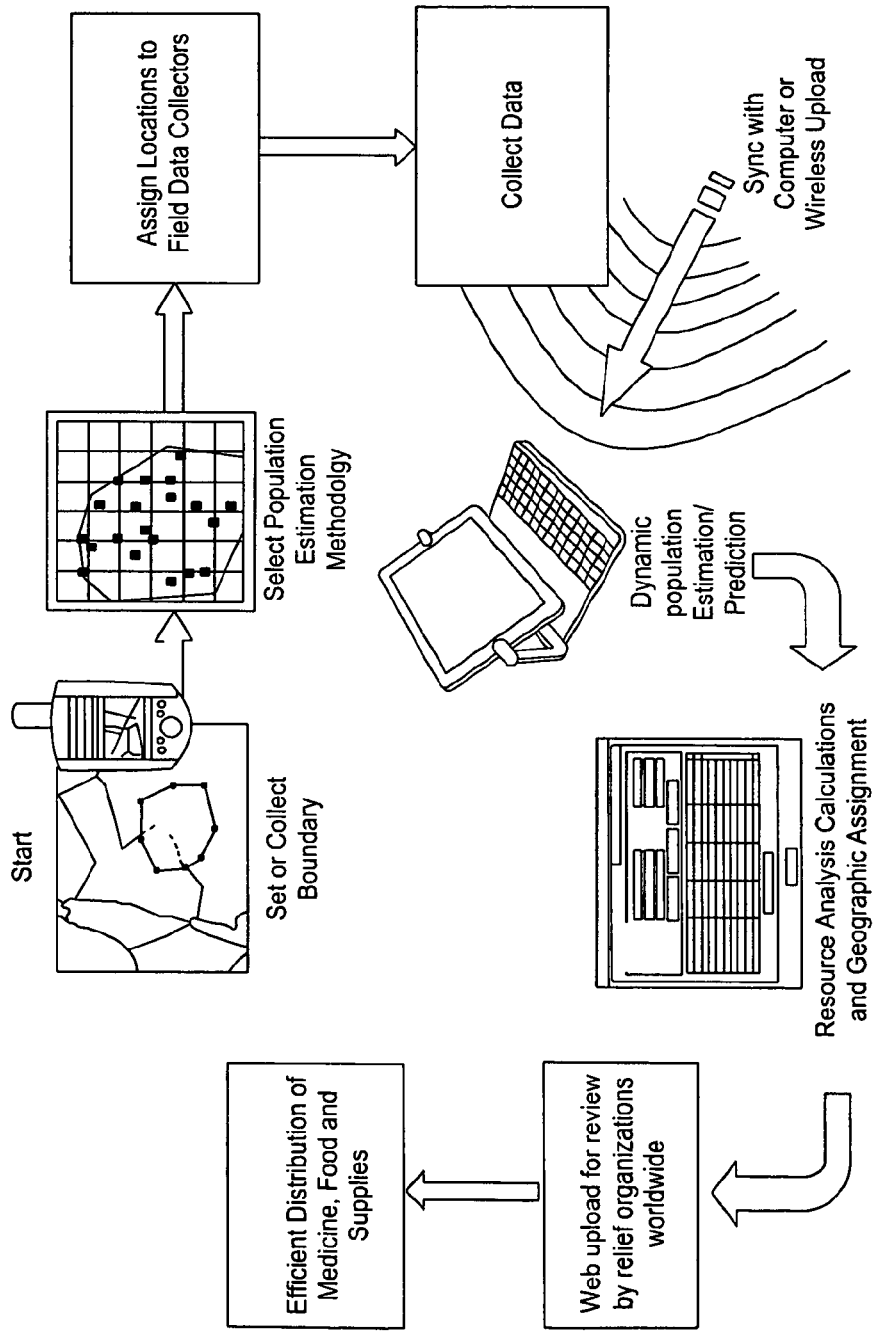
FIG. 19 is a schematic drawing illustrating further details of CensusView™.

Further details of CensusView are disclosed in FIG. 19.

Figure 20:
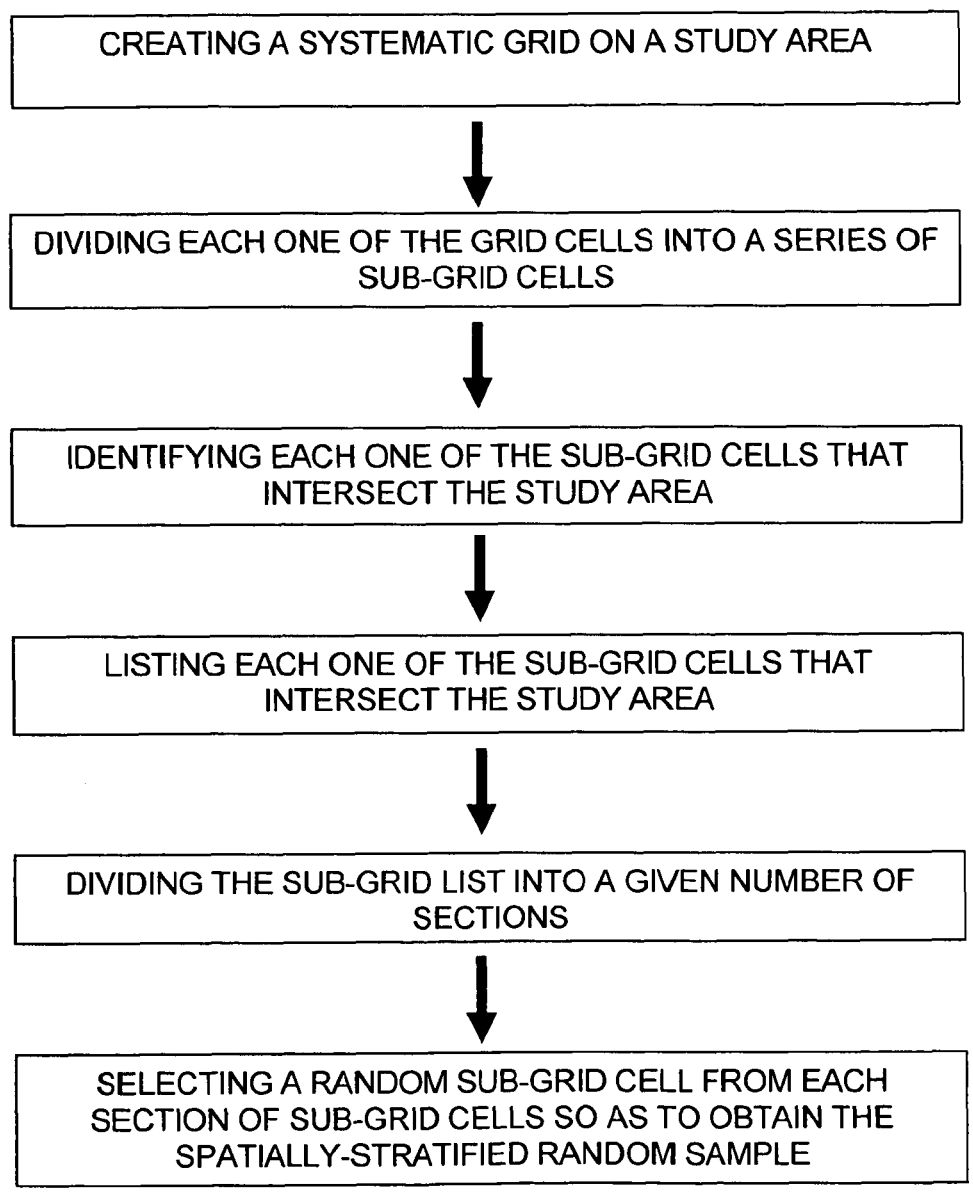
FIG. 20 is a schematic illustration of a method of rapidly assessing population with a spatially-stratified random sample.

Looking now at FIG. 20, in one embodiment of the present invention, there is provided a method 400 of rapidly assessing population with a spatially-stratified random sample, the method comprising creating a systematic grid on a study area, the systematic grid being defined by a given number of target grid points so as to form grid cells, dividing each one of the grid cells into a series of sub-grid cells, each one of the series of sub-grid cells being identified from left to right and from bottom to top within each one of the grid cells, identifying each one of the sub-grid cells that intersect the study area, listing each one of the sub-grid cells that intersect the study area, the list of sub-grid cells being sequences in the same order as the grid cells and the sub-grid cells, dividing the sub-grid list into a given number of sections, each of the given number of sections being configured to have substantially equal numbers of sub-grid cells, and the given number of sections being equal to the given number of targeted grid points, and selecting a random sub-grid cell from each section of sub-grid cells so as to obtain the spatially-stratified random sample.

In one embodiment, the selected random sub-grid cell from each section of sub-grid cells is utilized so as to define random sampling locations for population survey and computation. In one embodiment, the random sampling locations for population survey and computation maximizes the equality of possible spatial sampling location selection. In one embodiment, the method further comprises the step of providing an inner buffer polygon within an outer boundary of the study area so as to avoid creating unusable sampling points. In one embodiment, the method further comprises the step of providing an exclusive area polygon to define an unwanted sampling area within the study area. In one embodiment, the method further comprises the step of providing a cluster area polygon to define a separate frequency sampling from the study area so as to enable complex population cluster sampling. In one embodiment, the study area is a polygon and the study area polygon is formed using data entered by a user. In one embodiment, the data entered by the user is a list of coordinates. In another embodiment, the data entered by the user comprises entries made on a map by the user and the data comprises digitization of the entries made on the map. In one embodiment, the study area is a polygon and the study area polygon is formed using collected data. In one embodiment, the steps are programmed in Java.

Figure 21:
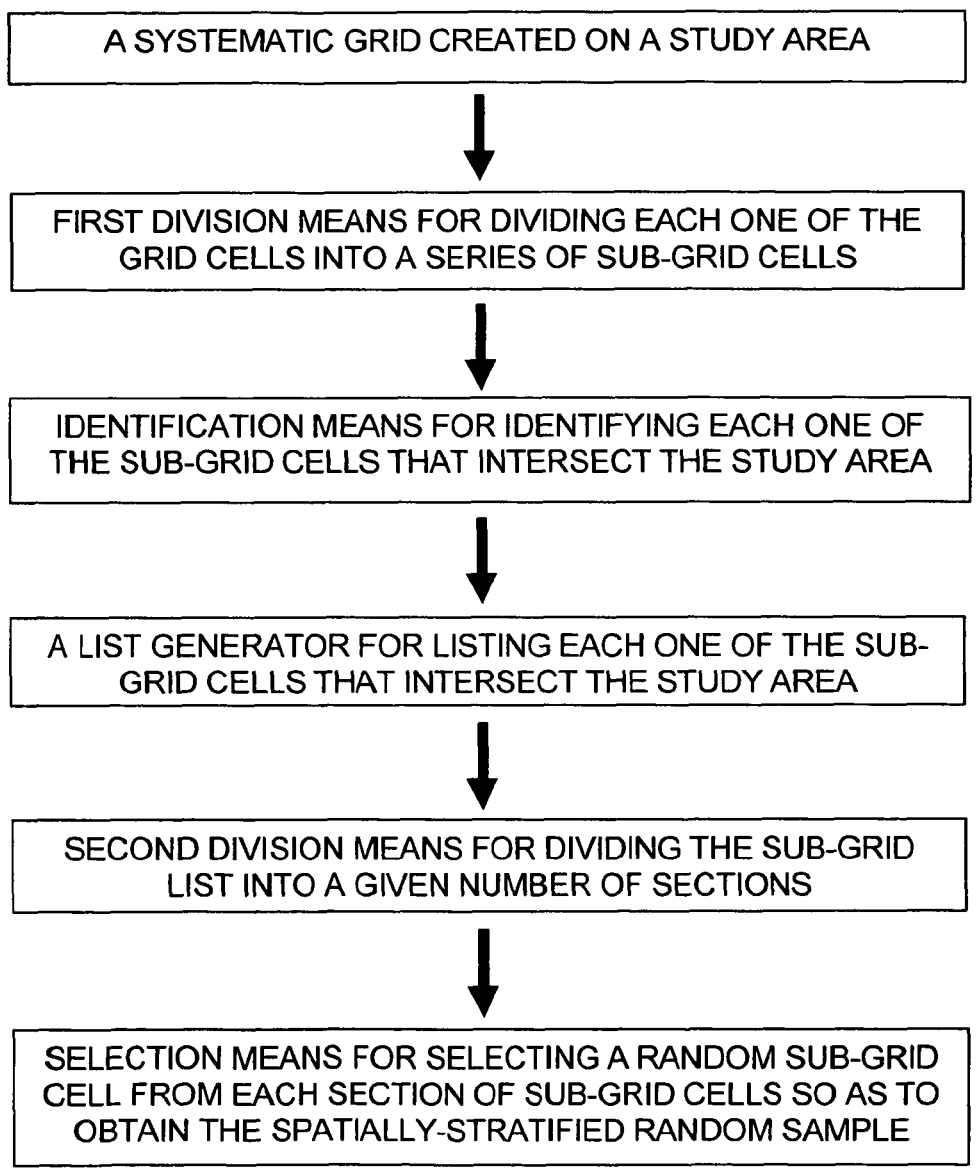
FIG. 21 is a schematic illustration of a system for rapidly assessing population with a spatially-stratified random sample.

Looking now at FIG. 21, in another embodiment of the present invention, there is provided a system 500 for rapidly assessing population with a spatially-stratified random sample, the system comprising a systematic grid created on a study area, the systematic grid being defined by a given number of target grid points so as to form grid cells, first division means for dividing each one of the grid cells into a series of sub-grid cells, each one of the series of sub-grid cells being identified from left to right and bottom to top within each one of the grid cells, identification means for identifying each one of the sub-grid cells that intersect the study area, a list generator for listing each one of the sub-grid cells that intersect the study area, the list of sub-grid cells being sequenced in order of the grid cells and the sub-grid cells, second division means for dividing the sub-grid list into a given number of sections, each of the given number of sections being configured to have a substantially equal number of sub-grid cells, and the given number of sections being equal to the given number of targeted grid points, and selection means for selecting a random sub-grid cell from each section of sub-grid cells so as to obtain the spatially-stratified random sample.

In one embodiment, the system further comprises an inner buffer polygon within an outer boundary of the study area so as to avoid creating unusable sampling points. In one embodiment, the system further comprises an exclusive area polygon for defining an unwanted sampling area within the study area. In one embodiment, the system further comprises a cluster area polygon for defining a separate frequency sampling from the study area so as to enable complex population cluster sampling. In one embodiment, the study area is a polygon and the study area polygon is formed using data entered by a user. In one embodiment, the data entered by the user is a list of coordinates. In one embodiment, the data entered by the user comprises entries made on a map by the user and the data comprises digitization of the entries made on the map. In one embodiment, the study area is a polygon and the study area polygon is formed using collected data. In one embodiment, the first division means, the identification means, the list generator, the second division means, and the selection means are programmed in Java.

Figure 22:
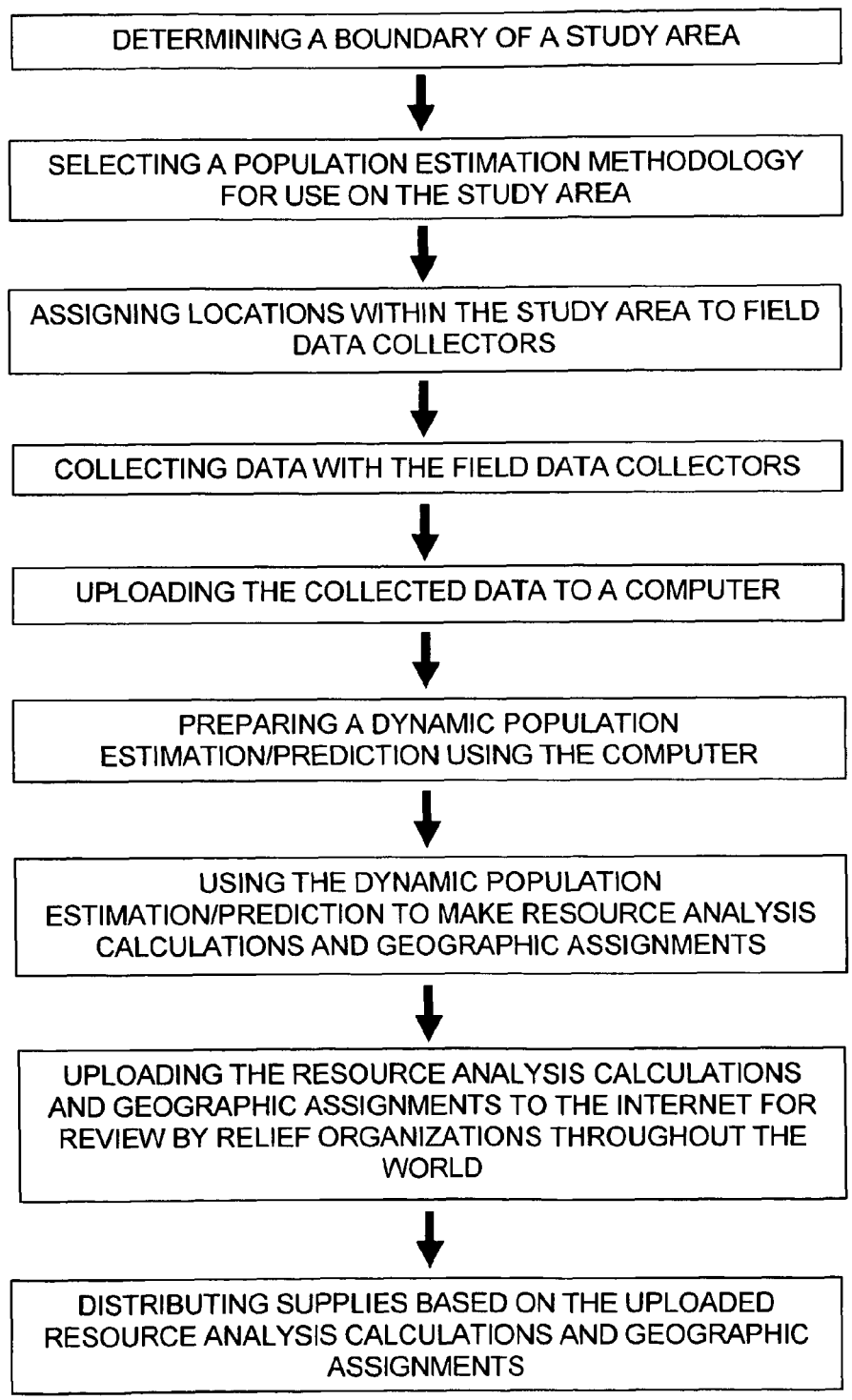
FIG. 22 is a schematic illustration of a method of rapidly assessing a population.

Looking now at FIG. 22, in another embodiment of the present invention, there is provided a method 600 of rapidly assessing a population, the method comprising determining a boundary of a study area, selecting a population estimation methodology for use on the study area, assigning locations within the study area to field data collectors, collecting data with the field data collectors, uploading the collected data to a computer, preparing a dynamic population estimation/prediction using the computer, using the dynamic population estimation/prediction to make resource analysis calculations and geographic assignments, uploading the resource analysis calculations and geographic assignments to the Internet for review by relief organizations throughout the world, and distributing supplies based on the uploaded resource analysis calculations and geographic assignments.

In one embodiment, the boundary of the study area is determined by a user entering data. In another embodiment, the boundary of the study area is determined by collected data. In one embodiment, the population estimation methodology comprises at least one selected from a group consisting of a quadrant method, a T-square method, a point quarter method, and a transect method.

Figure 23:
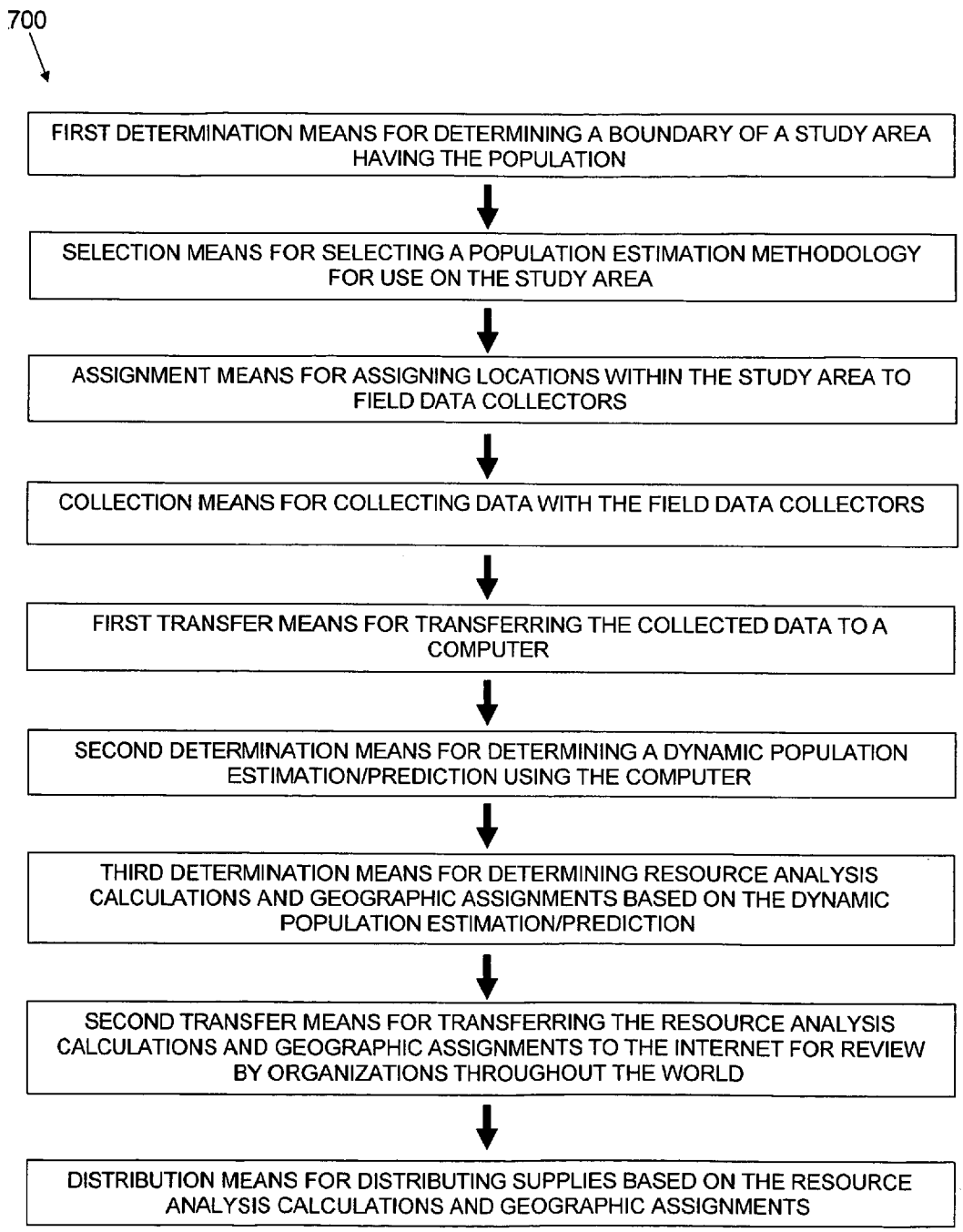
FIG. 23 is a schematic illustration of a system for rapidly assessing population.

Looking now at FIG. 23, in another embodiment there is provided a system 700 for rapidly assessing population, the system comprising first determination means for determining a boundary of a study area having the population, selection means for selecting a population estimation methodology for use on the study area, assignment means for assigning locations within the study area to field data collectors, collection means for collecting data with the field data collectors, first transfer means for transferring the collected data to a computer, second determination means for determining a dynamic population estimation/prediction using the computer, third determination means for determining resource analysis calculations and geographic assignments based on the dynamic population estimation/prediction, second transfer means for transferring the resource analysis calculations and geographic assignments to the Internet for review by organizations throughout the world, and distribution means for distributing supplies based on the resource analysis calculations and geographic assignments.

In one embodiment, the population estimation methodology comprises at least one selected from a group consisting of a quadrant method, a T-square method, a point quarter method, and a transect method.

Figure 24:
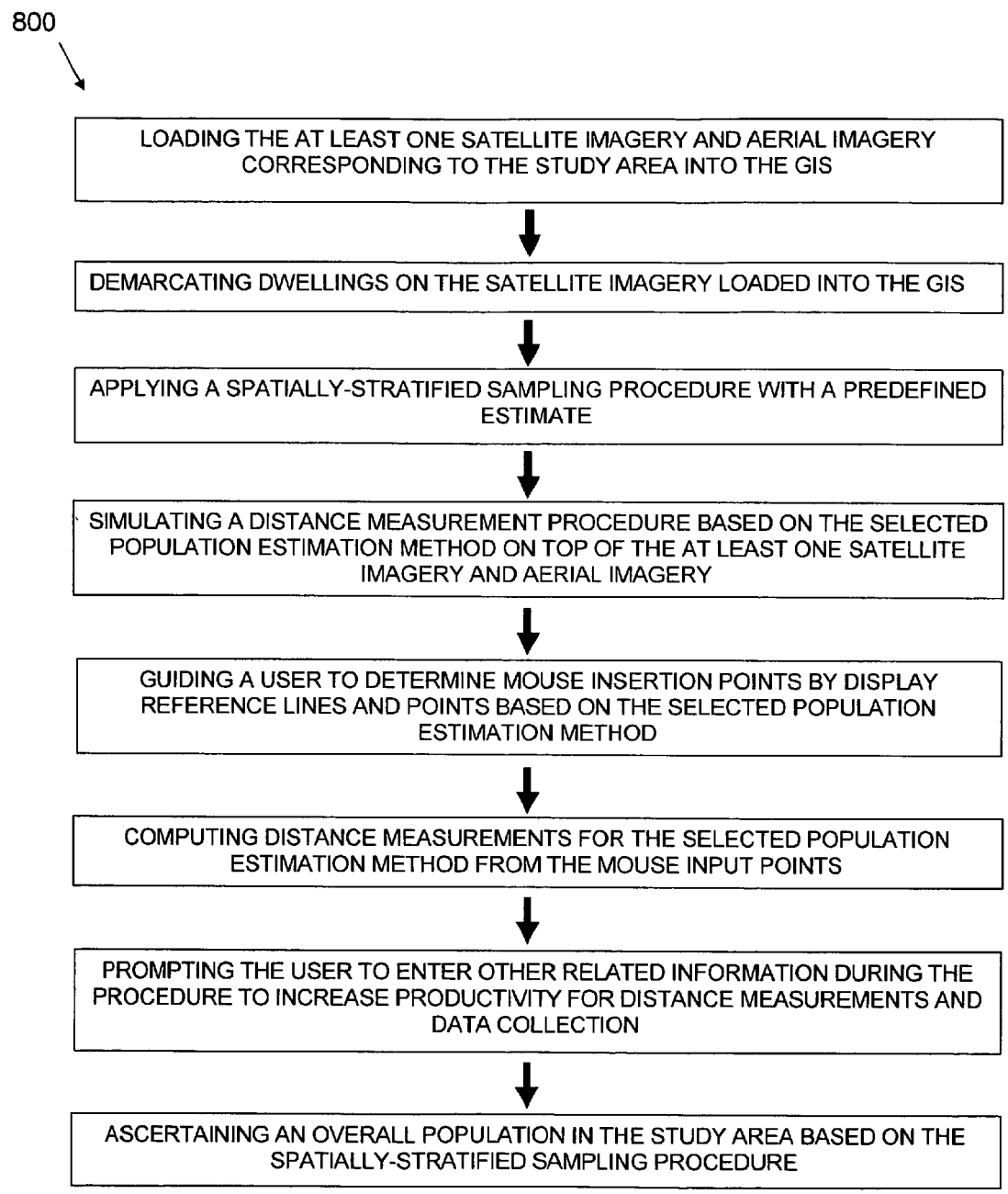
FIG. 24 is a schematic illustration of a method of rapidly assessing population within a study area.

Looking now at FIG. 24, in another embodiment there is provided a method 800 of rapidly assessing population within a study area using an integration of geographic information system (GIS), at least one of satellite imagery and aerial imagery, and a selected population method, the method comprising loading the at least one satellite imagery and aerial imagery corresponding to the study area into the GIS, demarcating dwellings on the satellite imagery loaded into the GIS, applying a spatially-stratified sampling procedure with a predefined estimate, simulating a distance measurement procedure based on the selected population estimation method on top of the at least one satellite imagery and aerial imagery, guiding a user to determine mouse insertion points by display reference lines and points based on the selected population estimation method, computing distance measurements for the selected population estimation method from the mouse input points, prompting the user to enter other related information during the procedure to increase productivity for distance measurements and data collection, and ascertaining an overall population in the study area based on the spatially-stratified sampling procedure.

In one embodiment, the at least one satellite imagery and aerial imagery comprises high resolution imagery, and the method further comprises the step of increasing roof-top distance measurements. In one embodiment, the method further comprises capabilities to use and integrate historical data into population computation and prediction. In one embodiment, the spatially-stratified sampling procedure comprises at least one selected from a group consisting of a quadrant method, a T-square method, a point square method, and a transect method.

Figure 25:
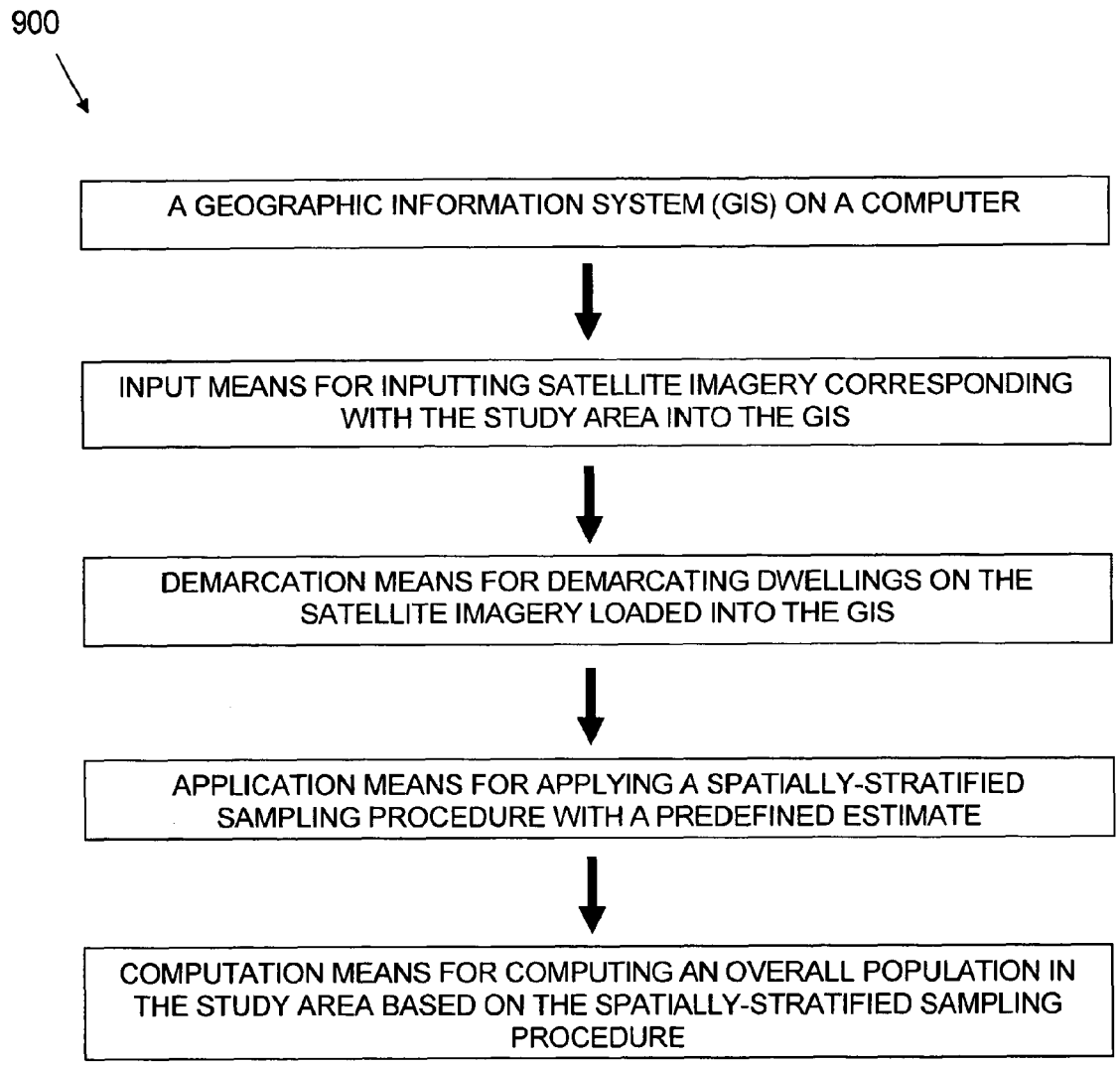
FIG. 25 is a schematic illustration of a system for rapidly assessing population within a study area.

Looking now at FIG. 25, in another embodiment there is provided a system 900 for rapidly assessing population within a study area, the system comprising a geographic information system (GIS) on a computer, input means for inputting satellite imagery corresponding with the study area into the GIS, demarcation means for demarcating dwellings on the satellite imagery loaded into the GIS, application means for applying a spatially-stratified sampling procedure with a predefined estimate, and computation means for computing an overall population in the study area based on the spatially-stratified sampling procedure.

In one embodiment, the spatially-stratified sampling procedure comprises at least one selected from a group consisting of a quadrant method, a T-square method, a point square method, and a transect method. In one embodiment, the system further comprises integration means for integrating geospatial web services for rapid population estimation based on Open GIS Consortium (OGC) specifications. In one embodiment, the system further comprises integration means for integrating Open Geospatial Web services architecture into rapid population estimation system development so as to enable the system to utilize world-wide geospatial information. In one embodiment, the system further comprises population estimation computation across all operating systems, using advanced Java algorithms. In one embodiment, the system further comprises seamless integration means for integrating multiple GPS platforms for rapid population estimation. In one embodiment, the multiple GPS platforms comprise at least one chosen from a group consisting of Garmin, Lowrance, Trimble.

Figure 26:
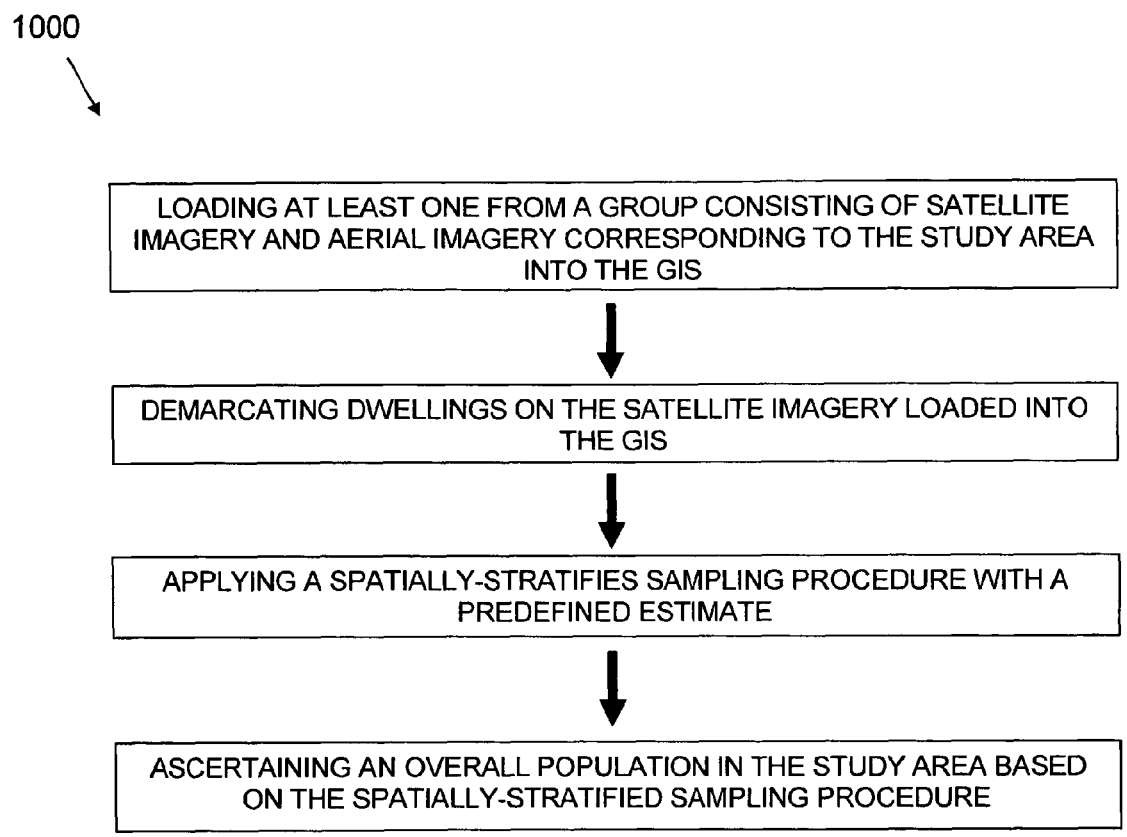
FIG. 26 is a schematic illustration of a method of rapidly assessing population within a study area using a geographic information system (GIS).

Looking now at FIG. 26, in another embodiment there is provided a method 1000 of rapidly assessing population within a study area using a geographic information system (GIS), the method comprising loading at least one from a group consisting of satellite imagery and aerial imagery corresponding to the study area into the GIS, demarcating dwellings on the satellite imagery loaded into the GIS, applying a spatially-stratifies sampling procedure with a predefined estimate, and ascertaining an overall population in the study area based on the spatially-stratified sampling procedure.

What is claimed is:

1. A method of rapidly assessing population using a spatially-stratified random sample and displaying the assessed population to a user, the method comprising:

creating a systematic grid on a study area, the systematic grid being defined by a given number of target grid points so as to form grid cells;

dividing each one of the grid cells into a series of sub-grid cells, each one of the series of sub-grid cells being identified from left to right and from bottom to top within each one of the grid cells;

identifying each one of the sub-grid cells that intersect the study area;

listing each one of the sub-grid cells that intersect the study area, the list of sub-grid cells being sequences in the same order as the grid cells and the sub-grid cells;

dividing the sub-grid list into a given number of sections, each of the given number of sections being configured to have substantially equal numbers of sub-grid cells, and the given number of sections being equal to the given number of targeted grid points;

selecting a random sub-grid cell from each section of sub-grid cells so as to obtain the spatially-stratified random sample;

using the spatially-stratified random sample to assess the population; and displaying the assessed population to the user.

2. A method according to claim 1 further comprising the step of providing an inner buffer polygon within an outer boundary of the study area so as to avoid creating unusable sampling points.

3. A method according to claim 1 further comprising the step of providing an exclusive area polygon to define an unwanted sampling area within the study area.

4. A method according to claim 1 further comprising the step of providing a cluster area polygon to define a separate frequency sampling from the study area so as to enable complex population cluster sampling.

5. A method according to claim 1 wherein the steps are programmed in Java.

6. A method according to claim 1 wherein the selected random sub-grid cell from each section of sub-grid cells is utilized so as to define random sampling locations for population survey and computation.

7. A method according to claim 6 wherein the random sampling locations for population survey and computation maximizes the equality of possible spatial sampling location selection.

8. A method according to claim 1 wherein the study area is a polygon.

9. A method according to claim 8 wherein the study area polygon is formed using collected data.

10. A method according to claim 8 wherein the study area polygon is formed using data entered by a user.

11. A method according to claim 10 wherein the data entered by the user is a list of coordinates.

12. A method according to claim 10 wherein the data entered by the user comprises entries made on a map by the user and further wherein the data comprises digitization of the entries made on the map.

13. A system for rapidly assessing population using a spatially-stratified random sample and displaying the assessed population to a user, the system comprising:

a systematic grid created on a study area, the systematic grid being defined by a given number of target grid points so as to form grid cells;

first division means for dividing each one of the grid cells into a series of sub-grid cells, each one of the series of sub-grid cells being identified from left to right and bottom to top within each one of the grid cells;

identification means for identifying each one of the sub-grid cells that intersect the study area;

a list generator for listing each one of the sub-grid cells that intersect the study area, the list of sub-grid cells being sequenced in order of the grid cells and the sub-grid cells;

second division means for dividing the sub-grid list into a given number of sections, each of the given number of sections being configured to have a substantially equal number of sub-grid cells, and the given number of sections being equal to the given number of targeted grid points;

selection means for selecting a random sub-grid cell from each section of sub-grid cells so as to obtain the spatially-stratified random sample;

apparatus for using the spatially-stratified random sample to assess the population; and apparatus for displaying the assessed population to the user.

14. A system according to claim 13 further comprising an inner buffer polygon within an outer boundary of the study area so as to avoid creating unusable sampling points.

15. A system according to claim 13 further comprising an exclusive area polygon for defining an unwanted sampling area within the study area.

16. A system according to claim 13 further comprising a cluster area polygon for defining a separate frequency sampling from the study area so as to enable complex population cluster sampling.

17. A system according to claim 13 wherein the first division means, the identification means, the list generator, the second division means, and the selection means are programmed in Java.

18. A system according to claim 13 wherein the study area is a polygon.

19. A system according to claim 18 wherein the study area polygon is formed using collected data.

20. A system according to claim 18 wherein the study area polygon is formed using data entered by a user.

21. A system according to claim 20 wherein the data entered by the user is a list of coordinates.

22. A system according to claim 20 wherein the data entered by the user comprises entries made on a map by the user and further wherein the data comprises digitization of the entries made on the map.

23. A method of rapidly assessing a population, the method comprising:

determining a boundary of a study area;

selecting a population estimation methodology for use on the study area;

assigning locations within the study area to field data collectors;

collecting data with the field data collectors;

uploading the collected data to a computer;

preparing a dynamic population estimation/prediction using the computer;

using the dynamic population estimation/prediction to make resource analysis calculations and geographic assignments;

uploading the resource analysis calculations and geographic assignments to the Internet for review by relief organizations throughout the world; and distributing supplies based on the uploaded resource analysis calculations and geographic assignments.

24. A method according to claim 23 wherein the boundary of the study area is determined by a user entering data.

25. A method according to claim 23 wherein the boundary of the study area is determined by collected data.

26. A method according to claim 23 wherein the population estimation methodology comprises at least one selected from a group consisting of a quadrant method, a T-square method, a point quarter method, and a transect method.

27. A system for rapidly assessing population, the system comprising:

first determination means for determining a boundary of a study area having the population;

selection means for selecting a population estimation methodology for use on the study area;

assignment means for assigning locations within the study area to field data collectors;

collection means for collecting data with the field data collectors;

first transfer means for transferring the collected data to a computer;

second determination means for determining a dynamic population estimation/prediction using the computer;

third determination means for determining resource analysis calculations and geographic assignments based on the dynamic population estimation/prediction;

second transfer means for transferring the resource analysis calculations and geographic assignments to the Internet for review by organizations throughout the world; and distribution means for distributing supplies based on the resource analysis calculations and geographic assignments.

28. A system according to claim 27 wherein the population estimation methodology comprises at least one selected from a group consisting of a quadrant method, a T-square method, a point quarter method, and a transect method.

29. A method of rapidly assessing population within a study area using an integration of geographic information system (GIS), at least one of satellite imagery and aerial imagery of the study area, and a selected population method, the method comprising:

loading at least one of the satellite imagery and aerial imagery corresponding to the study area into the GIS;

demarcating dwellings on at least one of the satellite imagery and aerial imagery loaded into the GIS;

applying a spatially-stratified sampling procedure with a predefined estimate;

simulating a distance measurement procedure based on the selected population estimation method on top of at least one of the satellite imagery and aerial imagery;

guiding a user to determine mouse insertion points by display reference lines and points based on the selected population estimation method;

computing distance measurements for the selected population estimation method from the mouse input points;

prompting the user to enter other related information during the procedure to increase productivity for distance measurements and data collection; and ascertaining an overall population in the study area based on the spatially-stratified sampling procedure.

30. A method according to claim 29 wherein the at least one of satellite imagery and aerial imagery comprises high resolution imagery, and the method further comprises the step of increasing roof-top distance measurements.

31. A method according to claim 29 further comprising capabilities to use and integrate historical data into population computation and prediction.

32. A method according to claim 29 wherein the spatially-stratified sampling procedure comprises at least one selected from a group consisting of a quadrant method, a T-square method, a point square method, and a transect method.

33. A system for rapidly assessing population within a study area, the system comprising:
   a geographic information system (GIS) on a computer;
   input means for inputting satellite imagery corresponding with the study area into the GIS;
   demarcation means for demarcating dwellings on the satellite imagery loaded into the GIS;
   application means for applying a spatially-stratified sampling procedure with a predefined estimate; and
   computation means for computing an overall population in the study area based on the spatially-stratified sampling procedure.

34. A system according to claim 33 wherein the spatially-stratified sampling procedure comprises at least one selected from a group consisting of a quadrant method, a T-square method, a point square method, and a transect method.

35. A system according to claim 33 further comprising integration means for integrating geospatial web services for rapid population estimation based on Open GIS Consortium (OGC) specifications.

36. A system according to claim 33 further comprising integration means for integrating Open Geospatial Web services architecture into rapid population estimation system development so as to enable the system to utilize world-wide geospatial information.

37. A system according to claim 33 further comprising population estimation computation across all operating systems, using advanced Java algorithms.

38. A system according to claim 33 further comprising seamless integration means for integrating multiple GPS platforms for rapid population estimation.

39. A system according to claim 38 wherein the multiple GPS platforms comprise at least one chosen from a group consisting of Garmin, Lowrance, Trimble.

40. A method of rapidly assessing population within a study area using a geographic information system (GIS) and displaying the assessed population to a user, the method comprising:
   loading at least one of satellite imagery and aerial imagery corresponding to the study area into the GIS;
   demarcating dwellings on at least one of the satellite imagery and aerial imagery loaded into the GIS;
   applying a spatially-stratified sampling procedure with a predefined estimate to the study area;
   using the spatially-stratified sampling procedure to ascertain an overall population in the study area; and
   displaying the ascertained overall population to the user.

* * * * *